United States Patent [19]
Hirasawa et al.

[11] Patent Number: 5,946,504
[45] Date of Patent: *Aug. 31, 1999

[54] AUTOMATIC FOCUS ADJUSTING DEVICE IN CAMERA SYSTEM

[75] Inventors: Masahide Hirasawa; Naoya Kaneda; Hiroyuki Wada, all of Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/331,331

[22] Filed: Oct. 28, 1994

Related U.S. Application Data

[62] Division of application No. 08/053,973, Apr. 27, 1993, Pat. No. 5,369,461, which is a continuation of application No. 07/789,423, Nov. 4, 1991, abandoned, which is a continuation of application No. 07/668,343, Mar. 11, 1991, abandoned, which is a continuation of application No. 07/385,306, Jul. 25, 1989, abandoned.

[30] Foreign Application Priority Data

Jul. 29, 1988 [JP] Japan .................................. 63-189815
Sep. 18, 1988 [JP] Japan .................................. 63-233172
Dec. 26, 1988 [JP] Japan .................................. 63-328465

[51] Int. Cl.⁶ ...................................................... G03B 13/36
[52] U.S. Cl. ............................................................ 396/80
[58] Field of Search ............................. 348/347; 354/400, 354/402, 195.1, 195.12; 359/698, 823; 396/80, 81, 82

[56] References Cited

U.S. PATENT DOCUMENTS

| | | | |
|---|---|---|---|
| 4,740,064 | 4/1988 | Kono et al. | 348/347 X |
| 4,748,509 | 5/1988 | Otake et al. | 348/347 |
| 4,885,600 | 12/1989 | Iwasa et al. | 354/400 |

*Primary Examiner*—W. B. Perkey
*Attorney, Agent, or Firm*—Robin, Blecker & Daley

[57] ABSTRACT

An automatic focus adjusting device in a camera system includes a focus detecting circuit for a focusing state of an object image formed on an image plane by a photographic lens, a control circuit for producing a control signal on the basis of an output of the focus detecting circuit and for outputting the control signal to the photographic lens to control the same, and a characteristic detecting circuit for detecting a predetermined optical characteristic of the photographic lens. The control circuit is arranged to transmit the control signal to the photographic lens by defining as a parameter a change of the optical characteristic detected by the characteristic detecting circuit.

17 Claims, 23 Drawing Sheets

| LENS → CAMERA | CAMERA → LENS |
|---|---|
| ① S' <br> ② DRIVING CONDITION (ACTUAL DRIVING AMOUNT, ETC.) | ① DRIVING AMOUNT n OF FOCUSING LENS <br> ② DRIVING AMOUNT P PER UNIT TIME OF FOCUSING LENS <br> ③ DRIVING DIRECTION OF FOCUSING LENS |

FIG.13

| n<br>MOTOR SPEED NO. | ΔZn<br>SPEED OF CHANGE OF CIRCLE OF CONFUSION IN TELEPHOTO END AT FULL APERTURE |
|---|---|
| 0 | 0 (STOP) |
| 1 | 0.32 mm/sec |
| 2 | 0.45 |
| 3 | 0.65 |
| 4 | 0.89 |
| 5 | 1.28 |
| 6 | 1.79 |
| 7 | 2.55 |
| 8 | 3.57 |

FIG.14

| n | ΔZn | SPEED FROM ∞ TO 1.2m (FULL APERTURE F=1.4, CLOSEST FOCUSING DISTANCE=1.2m) | | |
|---|---|---|---|---|
| | | fT=100mm | fT=72mm | fT=54mm |
| 0 | 0 | — | — | — |
| 1 | 0.32 | 22 sec | 11 sec | 6.4 sec |
| 2 | 0.45 | 16 sec | 8.3 sec | 4.7 sec |
| 3 | 0.69 | 11 sec | 5.7 sec | 3.2 sec |
| 4 | 0.89 | 8 sec | 4.1 sec | 2.3 sec |
| 5 | 1.28 | 5.6 sec | 2.9 sec | (1.6 sec) |
| 6 | 1.79 | 4 sec | 2.1 sec | ( 1.2 sec ) |
| 7 | 2.55 | 2.8 sec | (1.5 sec) | ( 0.8 sec ) |
| 8 | 3.57 | (2 sec) | ( 1.0 sec ) | ( 0.6 sec ) |

FIG.15

| n \ F | 1.4 | 2.8 | 5.6 | 11 | 22 |
|---|---|---|---|---|---|
| 0 | 0 | 0 | 0 | 0 | 0 |
| 1 | 0.32 | 0.16 | 0.08 | 0.04 | 0.02 |
| 2 | 0.45 | 0.23 | 0.11 | 0.06 | 0.03 |
| 3 | 0.65 | 0.32 | 0.16 | 0.08 | 0.04 |
| 4 | 0.89 | 0.45 | 0.23 | 0.11 | 0.06 |
| 5 | 1.28 | 0.65 | 0.32 | 0.16 | 0.08 |
| 6 | 1.79 | 0.89 | 0.45 | 0.23 | 0.11 |
| 7 | 2.55 | 1.28 | 0.65 | 0.32 | 0.16 |
| 8 | 3.57 | 1.79 | 0.89 | 0.45 | 0.23 |

($\Delta Zn$)

FIG.16

| F | 1.0~2.0 | 2.0~4.0 | 4.0~8.0 | 8.0~16.0 | 16.0~ |
|---|---|---|---|---|---|
| $K_F$ | 1 | 2 | 3 | 4 | 5 |

| f (mm) | 80~110 | 56~80 | 40~56 | 28~40 | 20~28 | 14~20 | 10~14 |
|---|---|---|---|---|---|---|---|
| $K_f$ | 1 | 2 | 3 | 4 | 5 | 6 | 7 |

FIG.17
| n | MOTOR DUTY RATIO | DRIVING PATTERN |
|---|---|---|
| 8 | ALWAYS ON |  |
| 7 | ON  OFF<br>10 : 4 |  |
| 6 | 10 : 10 |  |
| 5 | 10 : 18 |  |
| 4 | 10 : 30 |  |
| 3 | 10 : 45 |  |
| 2 | 10 : 70 |  |
| 1 | 10 : 100 | |
FIG.18
| f \ F | 1.4<br>1.0~2.0 | 2.8<br>2.0~4.0 | 5.6<br>4.0~8.0 | 11.0<br>8.0~16.0 | 22.0<br>16.0~32.0 | —<br>32.0~ |
|---|---|---|---|---|---|---|
| 80~110 | 0 | 1 | 2 | 3 | 4 | 5 |
| 56~80 | 1 | 2 | 3 | 4 | 5 | 6 |
| 40~56 | 2 | 3 | 4 | 5 | 6 | 7 |
| 28~40 | 3 | 4 | 5 | 6 | 7 | 8 |
| 20~28 | 4 | 5 | 6 | 7 | 8 | 9 |
| 14~20 | 5 | 6 | 7 | 8 | 9 | 10 |
| 10~14 | 6 | 7 | 8 | 9 | 10 | 11 |
ΔK ACCORDING TO f AND F (fT=100mm, F0=1.4)

FIG.19

| ΔK | 0 | 1 | 2 | 3 | 4 | 5 | 6 | 7 | 8〜11 |
|---|---|---|---|---|---|---|---|---|---|
| LITTLE BLUR | 1 | 3 | 5 | 7 | 8 | 8 | 8 | 8 | 8〜8 |
| MIDDLE BLUR | 2 | 4 | 6 | 8 | 8 | 8 | 8 | 8 | 8〜8 | n ACCORDING TO ΔK

FIG.20

| F<br>f | 1.4<br>1.0〜2.0 | 2.8<br>2.0〜4.0 | 5.6<br>4.0〜8.0 | 11.0<br>8.0〜16.0 | 22.0<br>16.0〜32.0 | —<br>32.0〜 |
|---|---|---|---|---|---|---|
| 40〜56 | 0 | 1 | 2 | 3 | 4 | 5 |
| 28〜40 | 1 | 2 | 3 | 4 | 5 | 6 |
| 20〜28 | 2 | 3 | 4 | 5 | 6 | 7 |
| 14〜20 | 3 | 4 | 5 | 6 | 7 | 8 |
| 10〜14 | 4 | 5 | 6 | 7 | 8 | 9 |
| 7〜10 | 5 | 6 | 7 | 8 | 9 | 10 |

ΔK ACCORDING TO f AND F (fT=54mm, Fo=1.4)

WIDE-ANGLE ⟷ TELEPHOTO

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| A | 1 | 1 | 1 | 1 | 1 | 1 | 1 | 1 | 0 | 0  | 0  | 0  | 0  | 0  | 0  | 0  |
| B | 0 | 0 | 0 | 0 | 1 | 1 | 1 | 1 | 1 | 1  | 1  | 1  | 0  | 0  | 0  | 0  |
| C | 0 | 0 | 1 | 1 | 1 | 1 | 0 | 0 | 0 | 0  | 1  | 1  | 1  | 0  | 0  | 0  |
| D | 0 | 1 | 1 | 0 | 0 | 1 | 1 | 0 | 0 | 1  | 1  | 0  | 0  | 1  | 1  | 0  |

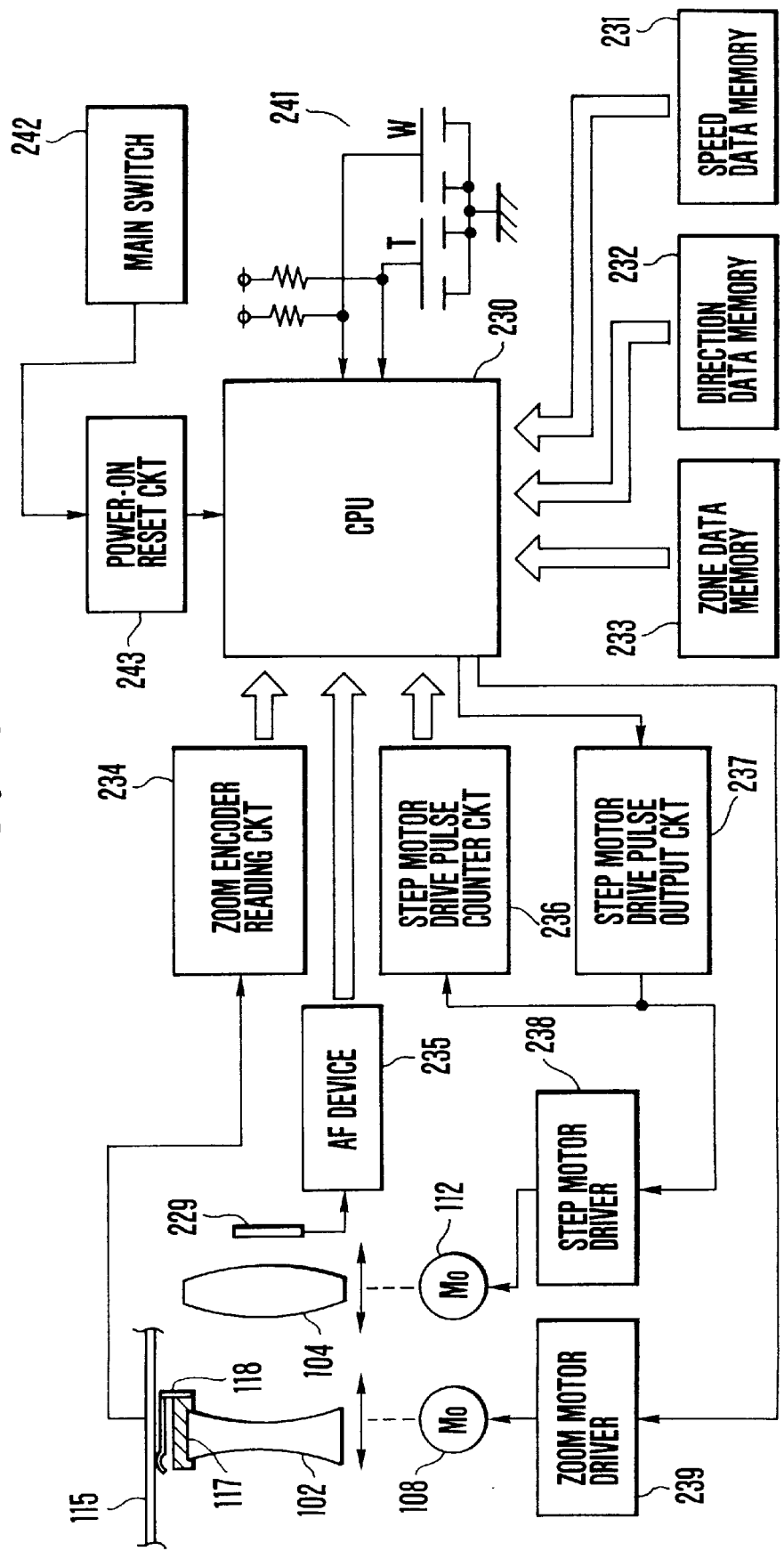
F I G. 28

AUTOMATIC FOCUS ADJUSTING DEVICE IN CAMERA SYSTEM

This application is a division of application Ser. No. 08/053,973, filed Apr. 27, 1993, now U.S. Pat. No. 5,369,461; which is a continuation of Ser. No. 07/789,423, filed Nov. 4, 1991, abandoned, which is a continuation of Ser. No. 07/668,343, filed Mar. 11, 1991, abandoned, which is a continuation of Ser. No. 07/385,306, filed Jul. 25, 1989, abandoned.

BACKGROUND OF THE INVENTION

1. Field of the Invention

This invention relates to cameras and, more particularly, to an automatic focus adjusting device in camera systems.

2. Description of the Related Art

The AF system for a video camera has its AF sensitivity and capability of moving the lens determined in adaptation to the various characteristics (for example, focal length, F-number at full open aperture and position sensitivity) of the lens system that camera carries therein. Also, the actuators for driving the lens and the diaphragm (including an electric motor for driving the lens group for focusing) and the encoders for detecting the operating positions of these members are connected, in the general case, directly to the AF control circuit. It is the present state of art that the design of the AF control circuit has to change individually by every lens type.

However, the above-described conventional example, when applied to the AF controlling of, for example, the lens-interchangeable camera system, because the versatility of the system itself is so low as not to accommodate all differences of each of the lens characteristics from type to type, produces problems such as those shown below.

(1) The AF control hardly suits with the changes of those many factors which are characteristic of the lens, such as the focal length, F-number and position sensitivity, as the lens is interchanged. Concretely speaking, the action up to the sharpest focus will be extremely slow, hunting will be caused not to stop when the in-focus state nears, or other faulty operations will take place with a high possibility.

(2) A lens system capable of matching with different AF models is difficult to design.

(3) Under the circumstances, in order to enhance the repertory of usable lenses, a large scale of memory elements must be used to process information when AF is in operation. This leads to a limit on improvement of the versatility, thus giving a main cause of hindering the camera system from a capability of using interchangeable lenses.

SUMMARY OF THE INVENTION

The present invention has been made to eliminate the above-described problems, and its first object is to provide a lens interchangeable camera with an automatic focus adjusting device capable, despite the type or characteristics of the lens, of accurately controlling automatic focus adjustment, thus providing a high versatility.

Another object of the invention is to provide an automatic focus adjusting device capable, despite the difference in the various characteristics such as focal length, F-number and position sensitivity between the interchanged lenses of different type, of smoothly carrying out the automatic focus adjusting operation.

Under such a situation, according to the invention, in a preferred embodiment, an automatic focus adjusting device is disclosed, comprising:

focus detecting means for detecting a focusing state of an object image formed on an image plane by a photographic optical system;

characteristic discriminating means for discriminating a predetermined optical characteristic of the photographic optical system;

control means for producing and outputting a drive control signal for driving the photographic optical system on the basis of an output of the focus detecting means by defining as a parameter a degree of change of the predetermined optical characteristic discriminated by the characteristic discriminating means; and transmission means for transmitting the drive control signal output from the control means to the photographic optical system.

Still another or third object of the invention is to provide a camera system capable, despite the combination of the camera with any lens, of assuring high accuracy and no faulty operation of automatic focus adjustment.

A fourth object of the invention is to provide a camera system in which the lens unit is made to possess data representing the specific optical characteristics of itself and this data is used as a common parameter between the lens unit and the camera unit in controlling the optical system.

In such a situation, according to the invention, in a preferred embodiment, a camera system is disclosed, having a camera body and a lens unit detachably attached to the camera body and comprising:

focus detecting means for detecting a focusing state of an object image formed on an image plane by the lens unit;

characteristic discriminating means for discriminating predetermined optical data of the lens unit;

control means for producing and outputting a control signal for driving a focusing lens in the lens unit on the basis of an output of the focus detecting means; and transmission means for transmitting to the lens unit the control signal by defining as a parameter an amount of change of the predetermined optical data discriminated by the characteristic discriminating means.

A fifth object of the invention is to provide a camera in which common focus control information is supplied to a plurality of lens units of different optical characteristics, thereby it being made possible to maintain the compatibility of the focus adjusting device.

To achieve this object, according to the invention, in a preferred embodiment, a camera is disclosed, having a lens unit detachably attached thereto, and comprising:

focus detecting means for detecting a focusing state of an object image formed on an image plane by the lens unit;

discriminating means for discriminating predetermined optical information of the lens unit;

computing means for producing and outputting a control signal for driving a focusing lens in the lens unit on the basis of an output of the focus detecting means by defining as a parameter an amount of change of the optical information discriminated by the discriminating means; and transmission means for transmitting the control signal output from the computing means to the lens unit.

A sixth object of the invention is to provide a lens unit capable of supplying parameters peculiar to the lens to the camera side in order to make common the control information to be supplied from the camera side.

To achieve this object, according to the invention, in a preferred embodiment, a lens unit is disclosed, comprising:

memory means for storing a predetermined optical information parameter of an optical system of the lens unit;

communication means for transmitting the optical information parameter stored in the memory means to a camera side and for receiving control information from the camera side; and computing means for computing a drive signal for driving the optical system in the lens unit on the basis of the control information from the camera side.

A seventh object of the invention is to provide a communication system between the camera body and the lens unit which enables the camera body and the lens unit detachably attached to the camera body to communicate with each other on the optical control information not susceptible to the influence of the difference of the optical characteristics of the lens unit.

Under such a situation, according to the invention, in a preferred embodiment, to effect communication of control information between a camera body and a lens unit detachably attached to the camera body, a communication system is disclosed, comprising:

first transmission means for transmitting operating position information indicative of an operating state of the lens unit and specific optical information to the camera body;

control means for producing and outputting a control amount of an optical system of the lens unit to change a state of the optical system on the basis of the operating position information received from the lens unit;

computing means for converting the control amount to control information by defining an amount of change of the optical information as a parameter; and second transmission means for transmitting the control information output from the computing means to the lens unit.

These features effect a result that when the lens system is controlled by the AF system to effect automatic focus adjustment, it is made possible by reducing the desired amount of movement of the lens or the image sensor to an amount of change of a diameter of a circle of confusion that without any complicated calculation, the communication and control coordination, and commonness between a plurality of focus detection types and a plurality of lens systems are enhanced, being very advantageous as the automatic focus adjusting device in the interchangeable lens system.

Other objects and features of the invention will become apparent from the written specification and drawings of the present patent application.

BRIEF DESCRIPTION OF THE DRAWINGS

FIG. 13 is a table to explain the definition of the speed of the drive means for the interchangeable lens of a fifth embodiment of the invention.

FIG. 14 is a table illustrating the values of the time it takes to move the lens of different focal length at the telephoto end throughout the focusing range of infinity to 1.2 meters.

FIG. 15 is a table illustrating the relationship of each speed number "n" with the speed of expansion of a circle of confusion as the F-number varies.

FIG. 16 is a conversion table of the successive zones of each of the ranges of variation of the aperture size F and the focal length f to the respective values of each of the variables $K_f$ and $K_F$ respectively.

FIG. 17 illustrates the patterns for the duty ratios as the speed is varied by controlling the duty of the pulse motor.

FIG. 18 is a table to explain determination of the value of $\Delta K$ depending on the combination of the focal length and F-number for a lens having a maximum focal length $f_T=100$ mm and a full open aperture $F_0=1.4$.

FIG. 19 is a table for conversion between $\Delta K$ and "n".

FIG. 20 is a table for determining the value of $\Delta K$ by the focal length and F-number in combination for a lens of $f_T=50$ mm and $F_0=1.4$.

FIG. 28 is a block diagram illustrating the coordination control according to the present embodiment.

DETAILED DESCRIPTION OF THE PREFERRED EMBODIMENTS

Figure 1:
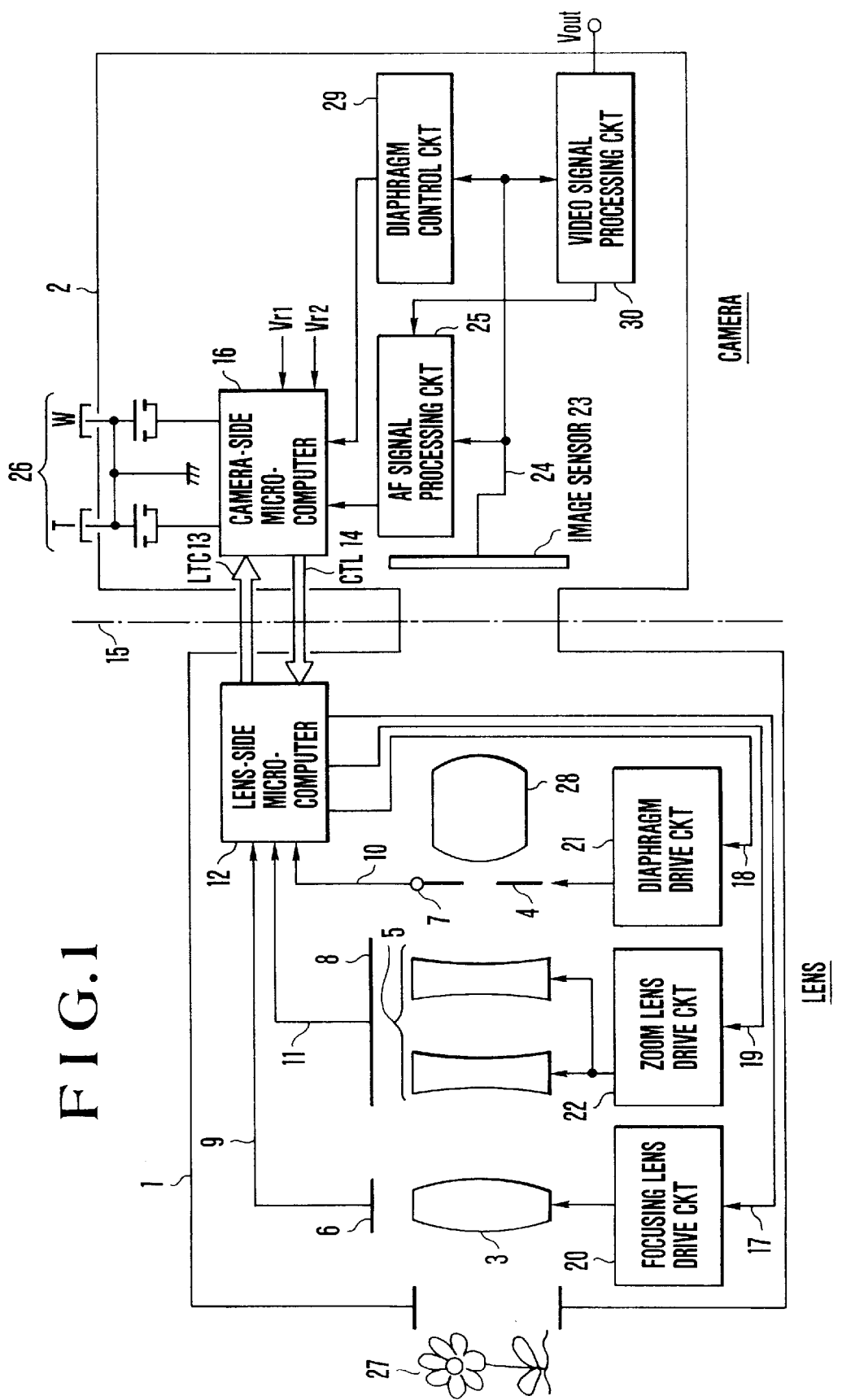
FIG. 1 is a block diagram of a first embodiment of an automatic focus adjusting device according to the invention.

The automatic focus adjusting device in the present invention is next described in connection with embodiments illustrated in the respective individual drawings. The fundamental principle of the invention is first explained.

In the case of video cameras and like instruments having an optical system, before the optical system is designed with the use of a method of moving a lens to obtain a sharp image of an object to be photographed on an image pickup plane, the artisan needs to have knowledge of the ratio of the changed degree of image sharpness, or the amount $\Delta Z$ of change of the diameter of a circle of confusion to the movement $\Delta A$ of the lens, or $\Delta Z/\Delta A$. As has already been known well, $\Delta Z/\Delta A$ is proportional to the square of the rate of change $\Delta f$ of the focal length and the rate of change of the aperture value $\Delta F$. In the lens system including the lenses for zooming, therefore, to effect the prescribed result of the amount $\Delta Z$ of change of the diameter of a circle of confusion, compensation must be made by increasing or decreasing the value of A by the position sensitivity as a function of the focal length and the aperture size.

By the way, in the camera having an AF control circuit adapted to be solely used with the associated lens system, the position sensitivity can be determined unequivocally by the combination of the absolute values of the focal length and the aperture size. In practice, therefore, for the given absolute values of the focal length and the aperture size, it is possible to determine $\Delta A$. On consideration of such an AF control circuit as to be responsible for a plurality of lens systems, in other words, on consideration of a capability of interchanging the lens system with another one, because the constant based on which the rates of change of the focal length and the aperture size are found to differ with different lens types, the mere knowledge of the absolute values of the focal length and the aperture size does not suffice for determining the required amount of movement $\Delta A$ of the lens.

Taking an example of a lens system including the most common type or 4-component zoom lens, the longest focal length $f_T$ is chosen as the start point of variation of the focal length, and the maximum aperture size $F_0$ as the start point from which the change of the aperture size is rated. In the zoom lens having four components, the first component, or the so-called front lens, is used for focusing. Letting the focal length of this first component be denoted by $f_F$, the position sensitivity $S_0$ at the focal length $f_T$ becomes $S_0 = (f_T/f_F)^2$. The position sensitivity S of the front lens at an arbitrary value of the focal length f can be expressed by $$S = (f/f_T)^2 \times S_0 \tag{1}$$

Here, the position sensitivity S, as well known, represents the translation of unit distance the focusing lens has moved to the distance of the focal plane, or the image plane of sharpest focus is shifted. By dividing this position sensitivity S by the aperture value F of that time, the variation of the diameter of a circle of confusion as the function of the amount of movement of the focusing lens can be found.

That is, this lens system, when in the focal length f and aperture size F, has its diameter of a circle of confusion varied by an amount: $\Delta Z = \Delta A\ S/F$. If $\Delta A$ is unit amount of movement of the lens, it becomes $$\Delta Z = S/F \tag{2}$$

Thus, the amount of change of the diameter of a circle of confusion as expressed in such a manner is used as a parameter for information transmission to perform a communication, so that a form of the lens driving command can be unified independent of the kind of lens, and the movement information transmitted from the lens to the camera can be transmitted in a uniform format independent of the kind of camera.

That is, since the rate of change of the diameter of a circle of confusion to the degree of focus does not change as the lens optical system is interchanged, this information is used as the common standardized control information parameter in the communication between the lens and the camera, for a versatility to, and the compatibility with, a plurality of lenses are insured. Accordingly, whatever characteristics the lens attached to the camera has, if the lens is driven in such a manner as to make constant a speed of change of the diameter of a circle of confusion, a change of blur is made constant with respect to all the lenses, so that the compatibility can be assured and a common lens control can be performed.

Examples of application of this fundamental principle to the automatic focus adjusting device are described in great detail below.

FIG. 1 in block diagram shows a first embodiment of the invention, wherein an automatic focus detecting device of the passive type which detects the degree of focus as the function of the proportion of the high frequency component in the video signals produced from the image sensor or the like is incorporated in the camera, so that based on the above-mentioned amount $\Delta Z$ of change of the diameter of a circle of confusion sent from the lens side, the camera side controls the lens side at the driving speed of the focusing lens to a proper value.

In FIG. 1, a lens part 1 includes what is called the lens system in the invention and a camera part 2 is constructed with inclusion of what is called the automatic focus adjusting device in the invention. The lens part 1 comprises a focusing lens 3, a diaphragm 4, a zooming lens 5, an encoder 6 for detecting the position of the focusing lens 3, another encoder 7 for detecting the size of opening of the diaphragm aperture, still another encoder 8 for detecting the position of the zooming lens 5, and signal paths 9, 10 and 11 through which the outputs of the encoders 6, 7 and 8 for the focusing lens, diaphragm and zooming lens respectively pass to a microcomputer 12 for control within the lens part 1. The microcomputer 12 reads in the information from each of the encoders and is responsive to a drive command transmitted from a microcomputer 16 (to be described later) in the camera part 2 for correctly driving the focusing lens 3, the zooming lens 5 and the diaphragm 4. Another function of it is to transmit the driven results and the various data of the lens to the camera-side microcomputer 16. Every item of information from the lens-side microcomputer 12 is transmitted through a channel 13 to the camera-side microcomputer 16. From the camera-side microcomputer 16 to the lens-side microcomputer 12, every item of information is transmitted through another channel 14. Reference numeral 15 denotes a mount part by which the camera part and the lens part are coupled with each other. The camera-side microcomputer 16 has an automatic focus (AF) control function so that the drive command is given to the lens-side microcomputer 12 in order to form a sharp image of an object to be photographed on the imaging plane. Drive commands from the lens-side microcomputer 12 to drive circuits 20, 21 and 22 for the focusing lens 3, diaphragm 4 and zooming lens 5 pass through signal lines 17, 18 and 19 respectively. The drive circuits 20, 21 and 22 each responsive to the respective drive command from the lens-side microcomputer 12 drive the focusing lens 3, the diaphragm 4, or the zooming lens 5. An image sensor 23 such as a CCD has an imaging plane and converts an object image formed on the imaging plane to an electrical signal. The video signal obtained by the image sensor 23 goes out on an output line 24. A focus detecting (AF) signal processing circuit 25 receptive of the signal produced from the image sensor 23 produces an output representing, for example, the proportion of the high frequency component, the number of edge parts, or the like, suited to treatment for automatic focus detection. A zoom switch 26 when actuated causes the zooming lens 5 to move. Reference numeral 27 denotes an object to be photographed. A relay lens 28 is fixed relative to the image sensor 23. A diaphragm control circuit 29 receptive of the information from the image sensor 23, for example, representing the brightness signal level, produces a control signal for controlling the aperture size to an optimum value so that the luminance signal level becomes constant.

Also, reference numeral 30 denotes a video signal processing circuit receptive of the signal produced from the image sensor 23 for performing gamma correction, blanking, addition of synchronizing signals and other prescribed signal treatments to produce a formatted standard television signal at a video output terminal Vout thereof.

With the foregoing arrangement, light from the object 27 enters the focusing lens 3 and passes through the zooming lens 5, the opening of the diaphragm 4 and the relay lens 28 to form an image on the imaging plane of the image sensor 23. At this time, the zooming lens 5 can be set to a desired position in the range of movement thereof by the photographer manipulating the zoom switch 26. Also, this position of the zooming lens 5 is detected by the zoom encoder 8, of which the output is supplied as the position information on the transmission path 11 to the lens-side microcomputer 12.

The diaphragm 4 is controlled by the diaphragm control circuit 29 in such a manner that the light quantity at the image sensor 23 becomes constant, in other words, as has been described before, the level of the signal produced from the image sensor 23 becomes constant. This control signal is sent to the camera-side microcomputer 16 where it is translated, and communicated to the lens-side microcomputer 12 through the transmission channel 14 so that the exposure is automatically adjusted by the diaphragm drive circuit 21. Also, the aperture size is always detected by the encoder 7 and read in the lens-side microcomputer 12 through the transmission path 10. Such a control is repeated.

Now, the video signal corresponding to the object image produced from the image sensor 23 is converted by the AF signal processing circuit 25 to a signal proportional to the degree of focus, or a signal representing the amount of the high frequency component in the video signal, and whether the image is in focus or out of focus is judged. The signal corresponding to the degree of focus has another characteristic in that its level, or the level of the high frequency component, becomes maximum at the point of sharpest focus and lowers away from the in-focus point. And, in the invention, for the corresponding level of the high frequency component to the degree of focus, the threshold level is set in a plurality of stages. If out of focus, how much the image sharpness deviates from the in-focus point, in other words, the blur amount is detected by comparing the corresponding level of the high frequency component to the degree of focus with the above-described plurality of threshold levels.

Figure 2:
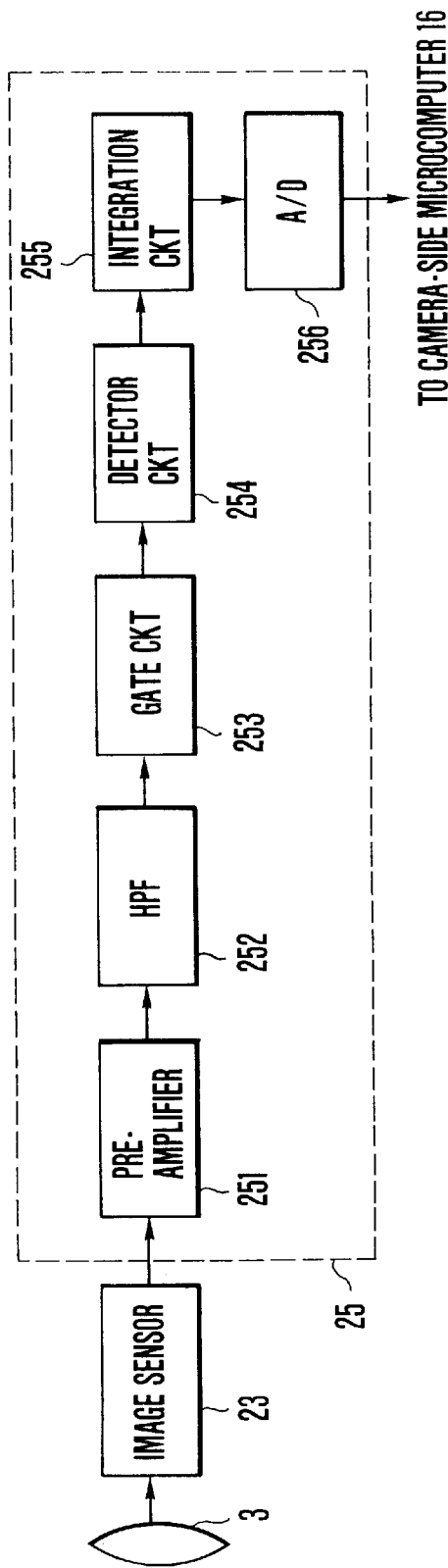
FIG. 2 is a block diagram of the construction of the focus detecting circuit of FIG. 1.

To perform such an operation, the AF signal processing circuit 25 is used. An example of its internal construction is shown in FIG. 2. The output of the image sensor 23 in the form of, for example, CCD, after having been amplified by a pre-amplifier 251 in the AF signal processing circuit 25 to a predetermined level, is applied to a high-pass filter (HPF) 252 (which may be replaced by a band-pass filter) where the prescribed high frequency component is extracted, and supplied to a gate circuit 253. The gate circuit 253 is provided for forming window pulses from the vertical and horizontal synchronizing signals produced from the video signal processing circuit 30 to extract only the corresponding ones of the video signals which come from a predetermined distance measuring area in the imaging plane of the image sensor 23. And, the high frequency component corresponding to the distance measuring area extracted by the gate circuit 253 is detected by a detector circuit 254 and then converted to a direct current level corresponding to the amount of the high frequency component by an integration circuit 255. This direct current level is a signal that varies depending on the degree of focus. So it is nothing but a focus voltage. This focus voltage is converted by an A/D converter 256 to a digital signal and supplied to the camera-side microcomputer 16. In the microcomputer 16, this focus voltage is stored in a memory, so that the newly input focus voltage level is compared periodically in each field with the focus voltage inputted in the preceding period and stored in the memory. To such a direction as their difference gets smaller, the focusing lens is driven, as the microcomputer 16 commands it. At the same time, the focus voltage level is compared with the threshold levels Vr1 and Vr2 previously set to the plurality of stages to detect how long the current lens position deviates from the in-focus position, or the blur amount. This is used in making determination of a driving speed of the focusing lens 3, as will be more fully described later. That is, in the automatic focus detecting system of the invention, the aforesaid blur amount is detected in successive fields to control the operation of the focusing lens in such a manner that when the blur amount is large, the moving speed of the focusing lens increases and, as the blur amount nears a minimum, the speed slows down to permit stoppage of the focusing lens just at the in-focus position.

Next, the means for communicating the control information between the lens and the camera is explained.

That is, according to the present embodiment, the sensitivity S at the present time of the lens side obtained on the basis of the above-described equation (1) is evaluated by the lens-side microcomputer 12 and further the amount ΔZ of change of the diameter of a circle of confusion is computed. These results are sent to the camera-side microcomputer 16 through the transmission channel 13.

Meanwhile, in the camera-side microcomputer 16, based on the information representing the result of examining whether in focus or out of focus obtained from the AF signal processing circuit 25 and, when out of focus, the information representing the blur amount, a datum for the lens side, or a proper driving speed of the focusing lens 3, is computed and a command for adjustment of the speed to this value is sent through the transmission channel 14 to the lens-side microcomputer 12. And, the focusing lens 3 is moved at this commanded speed. To do so, it is in the invention that the driving speed of the lens is defined in the reduced form to the amount of change of the diameter of a circle of confusion and the value of the speed to be commanded to the lens side, too, is expressed by the amount by which the diameter of a circle of confusion has to be changed per unit time, or the changed amount V. The amount P to be changed by the distance the focusing lens 3 must move in the unit time, can be expressed as:

$$P = V/\Delta Z \quad (3)$$

In this case, if the unit movement of the focusing lens 3 is in coincidence with the resolving power of the encoder 6, P represents a number of times the output of the encoder 6 changes for the unit time, (or a number of detected pulses.)

This value of P is transmitted as the commanded value of the speed from the camera-side microcomputer 16 to the lens-side microcomputer 12. On the lens side, this commanded value P is supplied to the focusing lens drive circuit 20, after it has been converted to a corresponding form to the manner in which the operation of the focusing lens is controlled. That is, if, in the lens side at the focusing lens drive circuit 20, the unity of movement of the focusing lens 3 is previously determined, the control may be made in such a manner that the focusing lens 3 moves by a distance equal to P times the unit movement. Thus, this control can be easily done.

Hence, if the motor for driving the focusing lens in the focusing lens drive circuit 20 is constructed in such a form like the stepping motor that as the unit movement, one step is defined so that the speed control can be made by the number of drive pulses per unit time, the speed can immediately be controlled in accordance with the commanded value P.

Another advantage arising from the permission of using such a periodic signal responsive drive source like the stepping motor is that instead of the P, 1/P may be transmitted. Because this means the period of the drive signal, the computing process of the camera-side microcomputer 16 can be simplified.

Figure 3:
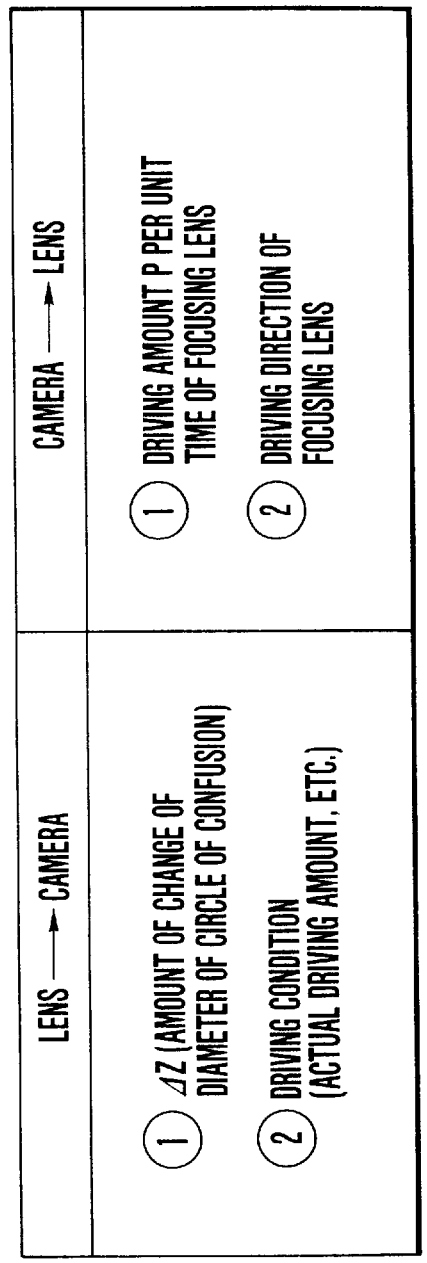
FIG. 3 is a scheme of the contents of communication of information between the lens and the camera.

FIG. 3 shows the contents about which the lens and the camera communicate each other in both directions to automatically control the focus adjustment. From the lens side to the camera side, the amount $\Delta Z$ of change of the diameter per unit time of a circle of confusion, the driving situation of the focusing lens (the actually driven amount detected by the focus encoder, and other items of information) are transmitted. From the camera side to the lens side, the amount of movement P to be driven per unit time of the focusing lens, the direction in which the lens is to move, and other items of information are transmitted.

Thus, the use of the amount $\Delta Z$ of change of the diameter of a circle of confusion per unit movement of the focusing lens as a common parameter enables focusing control to be made with any lens type and leads to secure the compatibility and the versatility.

Figure 4:
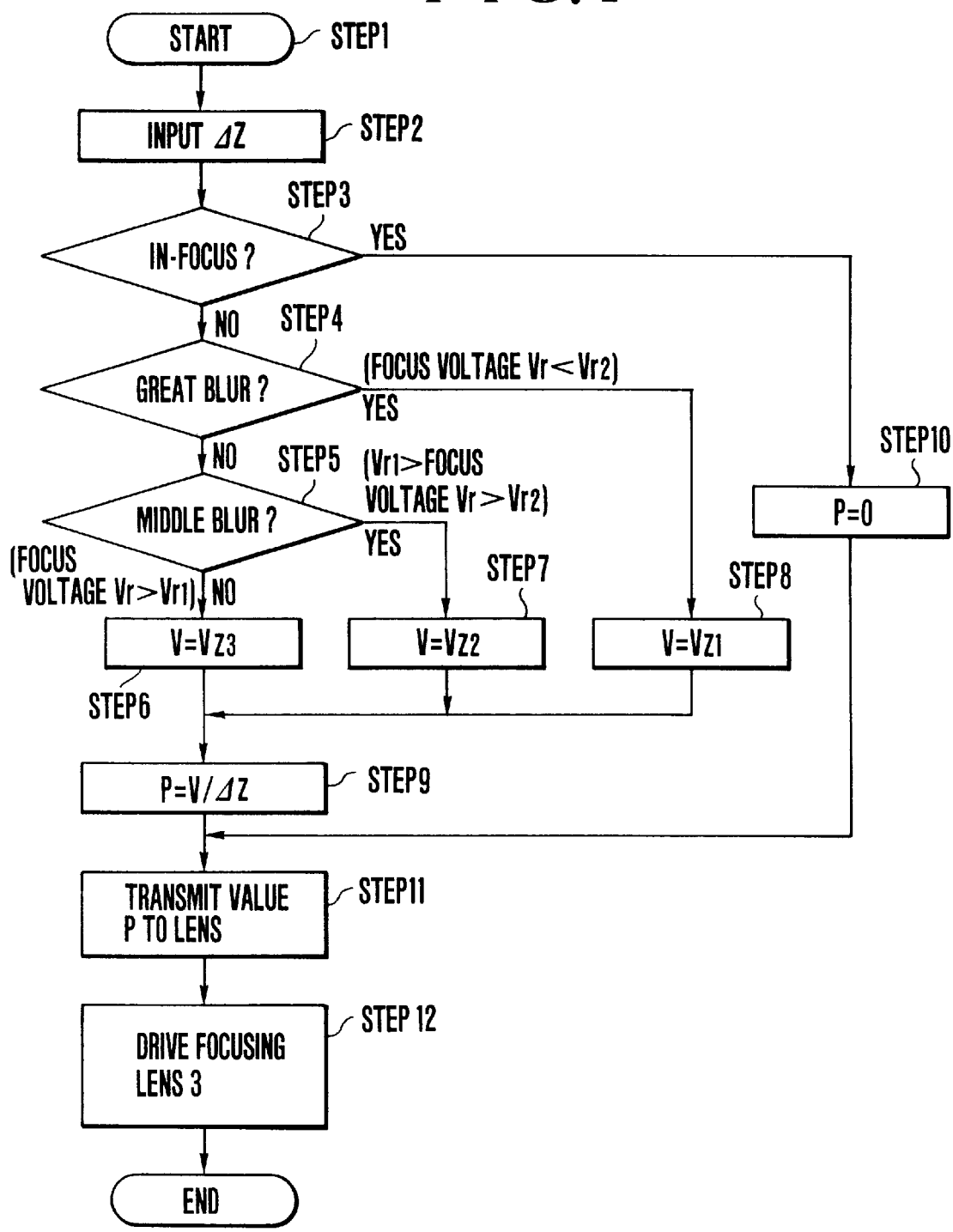
FIG. 4 is a flowchart illustrating the focus adjusting operation of the embodiment of FIG. 1.

FIG. 4 is a flowchart illustrating the above-described manner in which the driving speed of the focusing lens is controlled.

In a step 1, an automatic focus adjusting operation of the camera starts. Then in a step 2, the lens-side microcomputer 12 computes the aperture value, focal length and the position of the focusing lens the encoders 7, 8 and 6 have detected respectively for the given point of time to derive the amount $\Delta Z$ of change of the diameter of a circle of confusion. This information is transmitted to the camera-side microcomputer 16. Subsequently, whether the object image formed on the imaging plane of the image sensor 23 is in focus or out of focus is examined by the AF signal processing circuit 25 of the camera side in a step 3. And, if in focus, the program branches to a step 10 where the speed command value P of the aforesaid equation (3) is set to "0", and then sends it to the lens-side microcomputer 12 in a step 11. That is, if the in-focus state is established, the focusing lens 3 is stopped in order that the lens does not do an unnecessary operation.

Also, if the image is determined in the step 3 to be out of focus, the program advances to a step 4 and a step 5 successively where the focus voltage is compared with the two threshold levels Vr1 and Vr2 (Vr1>Vr2). Depending on the obtained blur amount, or defocus amount, whether the image is in a great blur state (the step 4) or in a middle blur state is determined respectively.

When, in the step 4, the great blur state has been detected (or the focus voltage Vr<Vr2), the program advances to a step 8 where in order to drive the focusing lens at a high speed, a speed command value Vz1 (high speed) for the event of large degrees of defocus is set in the variable of the changing speed of the diameter of a circle of confusion, and then advances to a step 9.

Also, as, in the step 4, the image was not in the great blur state (the focus voltage Vr<Vr2), the program has advanced to the step 5 where if the image is determined to be in the middle blur state (Vr1>focus voltage Vr>Vr2), the program advances to a step 7 of setting a speed command value Vz2 (middle speed) for the event of intermediate degrees of defocus or a slower speed than when in the great blur state, into the variable of the changing speed V of the diameter of a circle of confusion, and then advances to the step 9.

Furthermore, in a case where the image is determined not to be in the middle blur state (focus voltage Vr>Vr1), but to be in a little blur state, the program advances to a step 6 of setting a speed command value Vz3 for the event of small degrees of defocus, and then advances to the step 9.

In the step 9, the target amounts of change of the diameter of a circle of confusion per unit time set in the respective steps 6, 7 and 8, or the changed speed command values Vz1, Vz2 and Vz3 of the diameter of a circle of confusion, are divided by the amount of changed diameter of a circle of confusion per unit time at the present time to obtain the value P of the aforesaid equation (3).

And, the target value P of the amount of change derived in the step 9 is sent out to the lens side microcomputer 12 in the step 11 and supplied to the focusing lens drive circuit 20 after it has been converted to the form suited thereto.

By this, in a step 12, the focusing lens drive circuit 20 accelerates the focusing lens 3 to P times as fast a speed as the current lens driving speed. Thus, the focusing lens driving speed can be controlled at optimum in accordance with the distance from the in-focus position to the position of the focusing lens and the sensitivity.

Such a procedure is repeatedly performed when the automatic focus control is made.

Also, in the step 2, the amount $\Delta Z$ of change of the diameter of a circle of confusion is read from the lens side each time the control flow of FIG. 4 is repeated. After that, using the detection output from the AF signal processing circuit 25, the image on the imaging plane is judged to be either in focus, or greatly blurred, or moderately blurred, or otherwise slightly blurred. In response to each of these focus states, the corresponding one of the commanded values Vz1, Vz2 and Vz3 of the speed to change the diameter of a circle of confusion, which values are previously stored in the microcomputer 16 is selected and the program then goes to the step 9.

Incidentally, in the step 2, in the lens-side microcomputer 12, the amount $\Delta Z$ of change of the diameter of a circle of confusion is computed from the aperture value and the focal length. In actual practice, however, if the amounts $\Delta Z_0$ to $\Delta Z_n$ of change of the diameter of a circle of confusion in coincidence with the respective conditions of the aperture values $F_0$ to $F_n$ and the focal length values $f_T$ to $f_n$ are formed as an information table shown in FIG. 5 and stored in the lens-side microcomputer 12 or an external ROM (not shown), this value can immediately be chosen from the aperture value and the focal length at that time. Therefore, the computing speed and the computation algorithm can be greatly improved. Also, if the form of such an information table is taken, the ones of the amounts $\Delta Z$ of change of the diameter of a circle of confusion which are below a certain value, on consideration of the actual control from the correlation of the focal length f and the aperture value F, can also be made to become a constant value $Z_0$. Thus, a more practical control is possible.

Incidentally, in this table, the relation of each aperture value or each value of the focal length to the others is $F_0 < F_1 < \ldots < Fn$ ($F_0$ is the full open aperture value), or $f_T > f_1 > \ldots > fn$ ($f_T$ is at the telephoto end), and the relation of each value of the amount $\Delta Z$ of change of the diameter of a circle of confusion to the others is $\Delta Z_0 > \Delta Z_1 > \ldots \Delta Zn$.

According to the foregoing first embodiment, the application of the invention has been described in connection with a case that as the blur amount is successively detected and the driving speed of the focusing lens is set to the value depending on the blur amount, the control of the speed of the lens is optimized on the basis of the amount of change of the diameter of a circle of confusion per unit time. Next a second embodiment is described where the invention is applied to the automatic focus adjusting device of the phase detection type in which when the image is judged to be out of focus, the blur amount and either the near focus or far focus, that is, the blurring direction, are possible to determine, so that the control can be made by computing the distance the focusing lens is to move directly from the amount of change of the diameter of a circle of confusion for unit movement of the lens.

Figure 6:
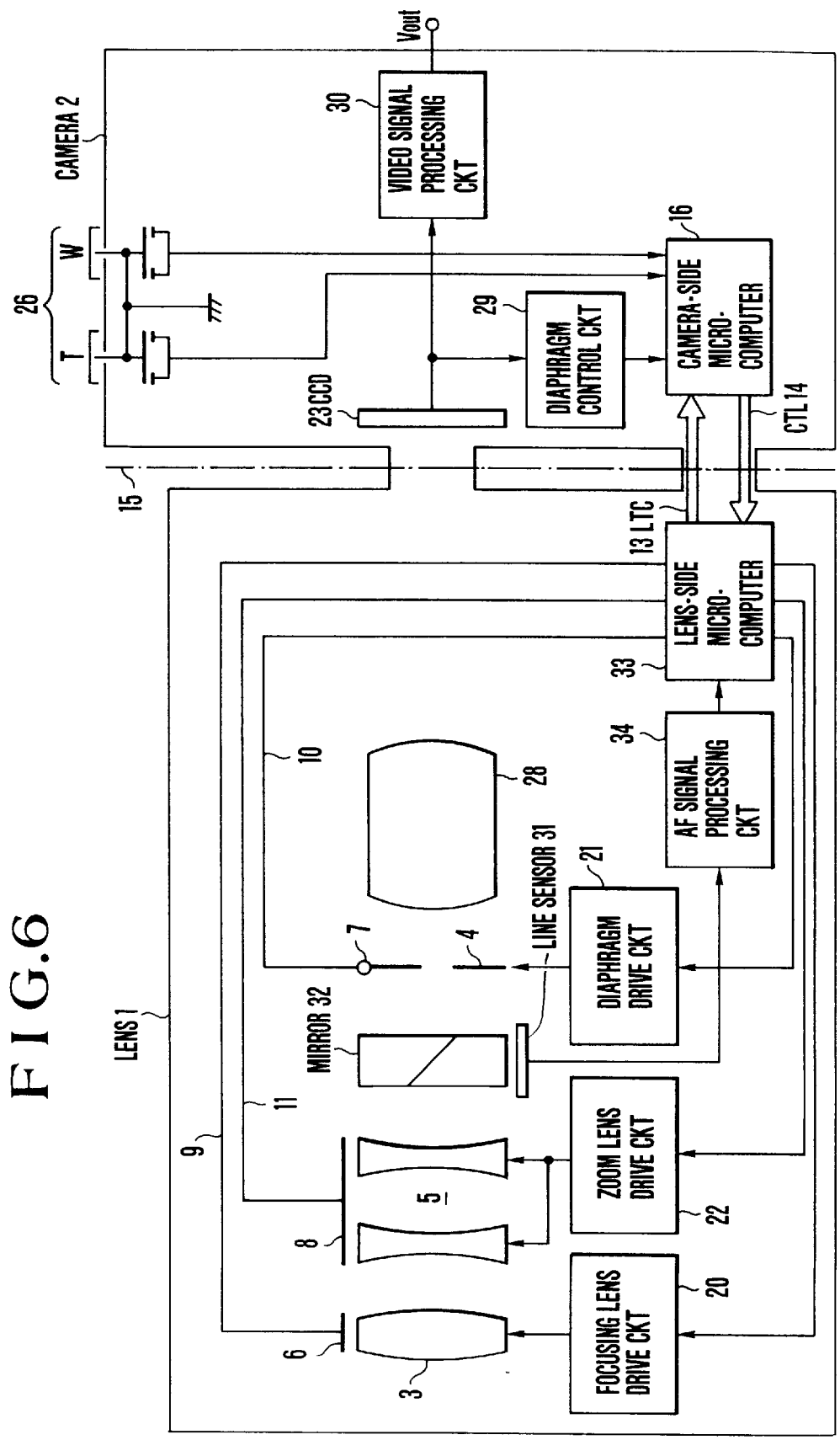
FIG. 6 is a block diagram of a second embodiment of the automatic focus adjusting device according to the invention.

FIG. 6 in block diagram shows the construction of the second embodiment. In FIG. 6, the same constituent parts as those in the first embodiment are denoted by using the same reference numerals to omit their explanation.

In the present embodiment, as the focus detecting means, use is made of a line sensor or so-called phase detection type focus detecting device. At first, the principle of this detecting method is explained by reference to FIGS. 8(A), 8(B) and 8(C).

Figure 8A:
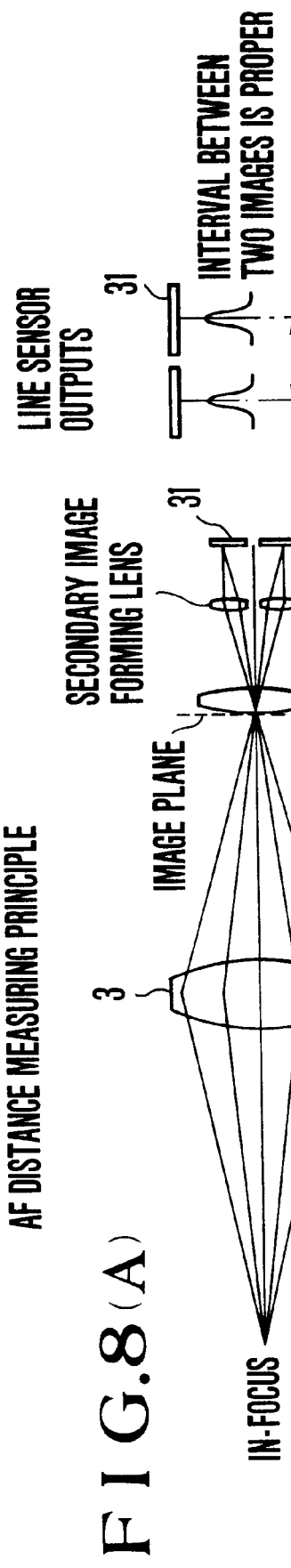
FIGS. 8(A), 8(B) and 8(C) are diagrams of optical geometry to illustrate the principle of the automatic focus detecting operation in the second embodiment.
Figure 8B:
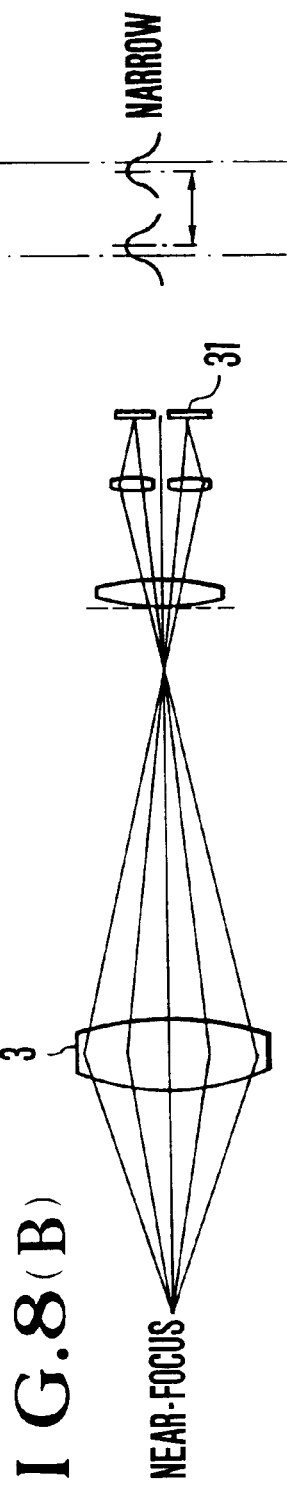
Figure 8C:
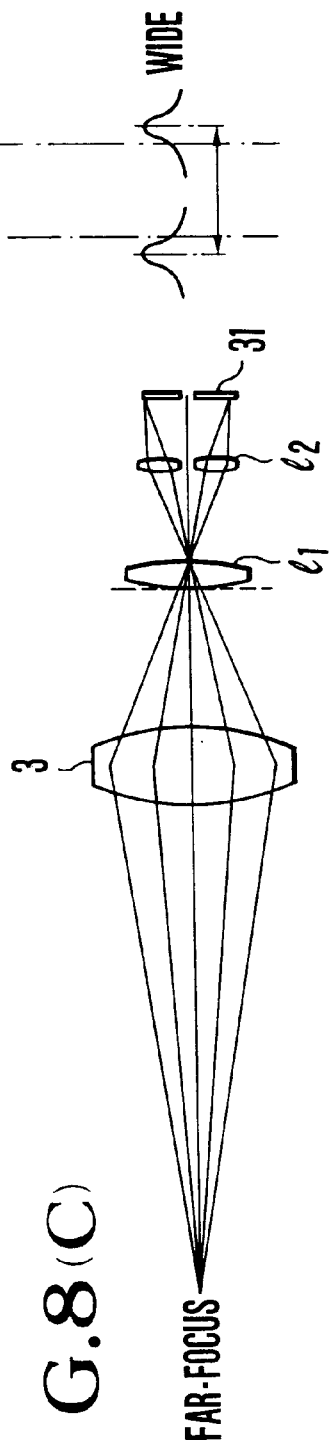

As the focusing lens 3 moves axially, two images of an object formed on respective sensor elements of the line sensor 31 with the light passing through a common field lens $l_1$ and respective secondary image forming lenses $l_2$ have their positions differentiated with different focus states, or the in-focus state of FIG. 8(A), the near-focus state of FIG. 8(B) and the far-focus state of FIG. 8(C). By measuring the amount of deviated distance between the two images to that when in the in-focus state, in-focus and out-of-focus can be discriminated from each other, and the direction to which the lens is to move can be detected.

In FIG. 6, to split the entering light off a portion to the line sensor 31 for focus detection, there is provided a mirror 32. The information representing the amount of deviation from the in-focus position from the line sensor 31, after having been subjected to prescribed treatments in an AF signal processing circuit 34, is supplied to a lens-side microcomputer 33 where whether the image is in focus or out of focus is judged. Other items of information, or the aperture value and, because of the zoom lens, the focal length detected by the encoders 7 and 8 respectively, are then supplied to the microcomputer 33 where the computation based on the before-described equations (1) and (2), the sensitivity S and the amount $\Delta Z$ of change of the diameter of a circle of confusion per unit movement of the lens are obtained.

The information representing these results of determination of the in-focus or the out-of-focus state, the amount $\Delta Z$ of change of the diameter of a circle of confusion per unit movement of the lens and, when out of focus, the amount and direction of deviation, is supplied through the channel 13 (LTC) to the camera-side microcomputer 16.

The camera-side microcomputer 16 then computes to which direction and how long the focusing lens is to move until the amount of deviation reduces to "0" or the in-focus state is established.

In more detail, since the amount of deviation corresponds to the amount the diameter of a circle of confusion is to change until the in-focus state is reached, it is from this amount of deviation that the required amount D of change of the diameter of a circle of confusion for bringing the image into sharp focus and the direction in which the lens is to move are determined. By dividing this required amount D of change of the diameter of a circle of confusion by the amount $\Delta Z$ of change of the diameter per unit movement, the necessary number of steps of the unit movement of the focusing lens 3 to reach the in-focus state is obtained.

So, if an arrangement is made that the focusing lens 3 moves a unit distance when the stepping motor in the drive circuit 20 therefor rotates one step, the number of steps "n" the drive circuit 20 must drive the lens until the image comes to sharp focus is obtained by $n = D/\Delta Z$.

Therefore, from the camera-side microcomputer 16 through the channel 14 (CTL) to the lens-side microcomputer 33, the items of information representing the computed value of the aforesaid variable "n" and the drive direction of the lens are transmitted. The lens-side microcomputer 33 then controls the drive circuit 20 in accordance with these items of information when the focusing lens 3 is driven to move. And, if the unit movement of the focusing lens 3 is set to be equal to the resolving power of the encoder 6, it results that as the focusing lens 3 moves in the indicated direction, the output of the encoder 6 changes "n" times when the object image comes in sharp focus.

Figure 5:
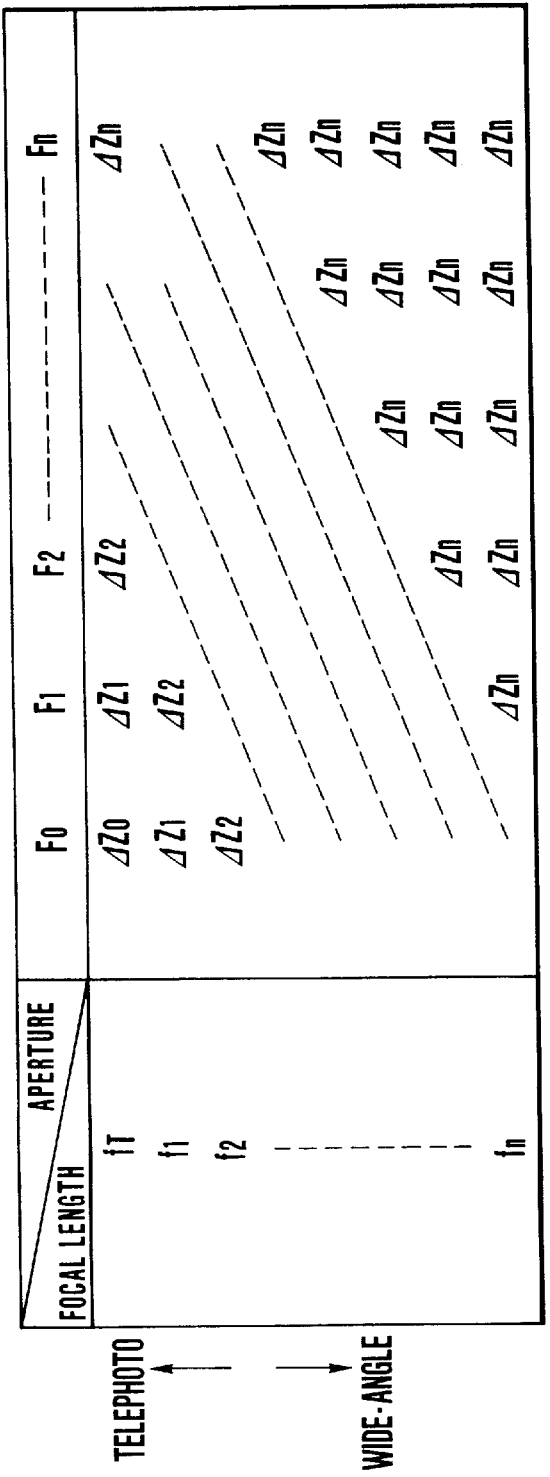
FIG. 5 is an information table for deriving the amount of change of a diameter of a circle of confusion.

It should be noted that even in this embodiment based on the information of the aperture value and the focal length obtained from the iris encoder 7 and the zoom encoder 8, the values of the amount of change of the diameter of a circle of confusion per unit movement of the focusing lens suited to the respective conditions may be tabulated as shown in FIG. 5 and stored in the information memory.

Figure 7:
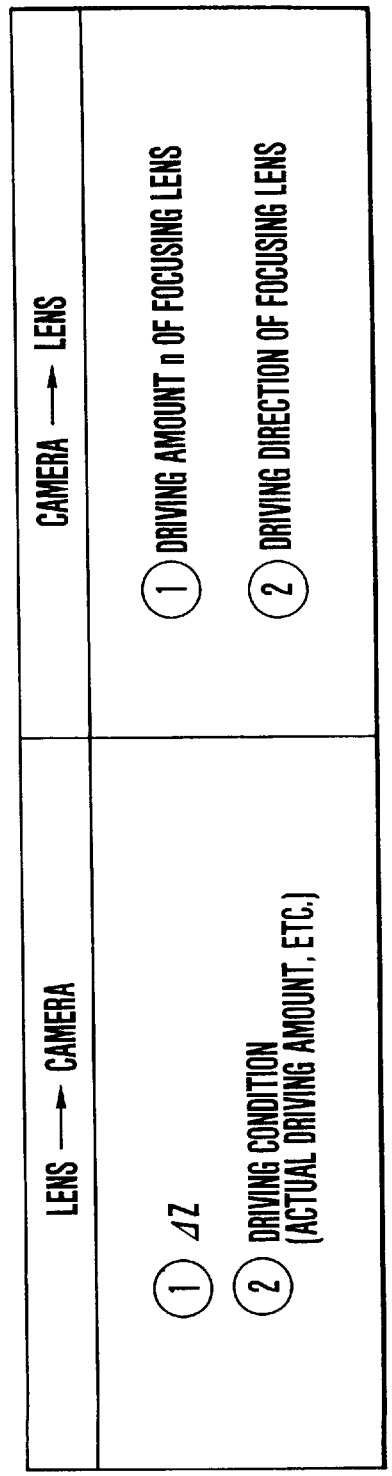
FIG. 7 is a scheme of the contents of information about which the lens and the camera communicate with each other in the second embodiment.

For the case of the present embodiment, too, the scheme of communication about data between the camera and the lens is shown in FIG. 7.

From the lens to the camera, what are transmitted are the data about the amount of change of the diameter of a circle of confusion and, when out of focus, the amount of deviation and the direction of deviation, and, if necessary, additional data about the drive conditions, for example, the pulses the encoder produces when the lens has actually moved, and the output of a counter therefor. Also, from the camera to the lens, the commands of the drive amount "n" of the focusing lens 3 and its drive direction determined from the blur amount and the amount of change of the diameter of a circle of confusion, etc. are sent.

Though, in the present embodiment, the line sensor 31 for the focus detection is arranged in front of the diaphragm 4, it may otherwise be arranged behind the diaphragm 4 or on the camera side. In this case, the accuracy of focus detection drops when the aperture size has a small value. Therefore, the error amount must be amplified depending on the sensitivity. But because of behind the diaphragm, the light amount becomes almost constant, giving an advantage in that there is no need to perform automatic gain control (AGC) for the line sensor.

In the above-described first embodiment, it is of the speed at which the focusing lens is to move that the lens is informed from the camera side. While the value of the speed is being varied with the degree of focus, the lens is brought into the in-focus position. Hence, the communication means adapted to this purpose is shown.

Also, in the above-described second embodiment, it is of the required amount of movement of the lens for bringing the image on the imaging plane into sharp focus and the required direction of movement that the camera is informed from the lens. In turn, based on this, the camera moves the lens to the in-focus position. Such a method of getting an image of sharp focus is shown.

However, even in a plurality of combinations of the common AF system with different types of the lens systems, the automatic focus adjustment must correctly be done. For this purpose, it is extremely advantageous that those items of information which are exclusively used in the respective first and second embodiments are provided to use in composite form, in other words, the three items of information, namely, the amount of movement of the lens, the speed of movement of the lens, and the direction of movement of the lens, are communicated at the same time. And, which of these items of information to adopt and which to ignore are chosen by the combined system.

A third embodiment of the present application is illustrated as applied to such a case of using the three items of information for control.

Figure 9:
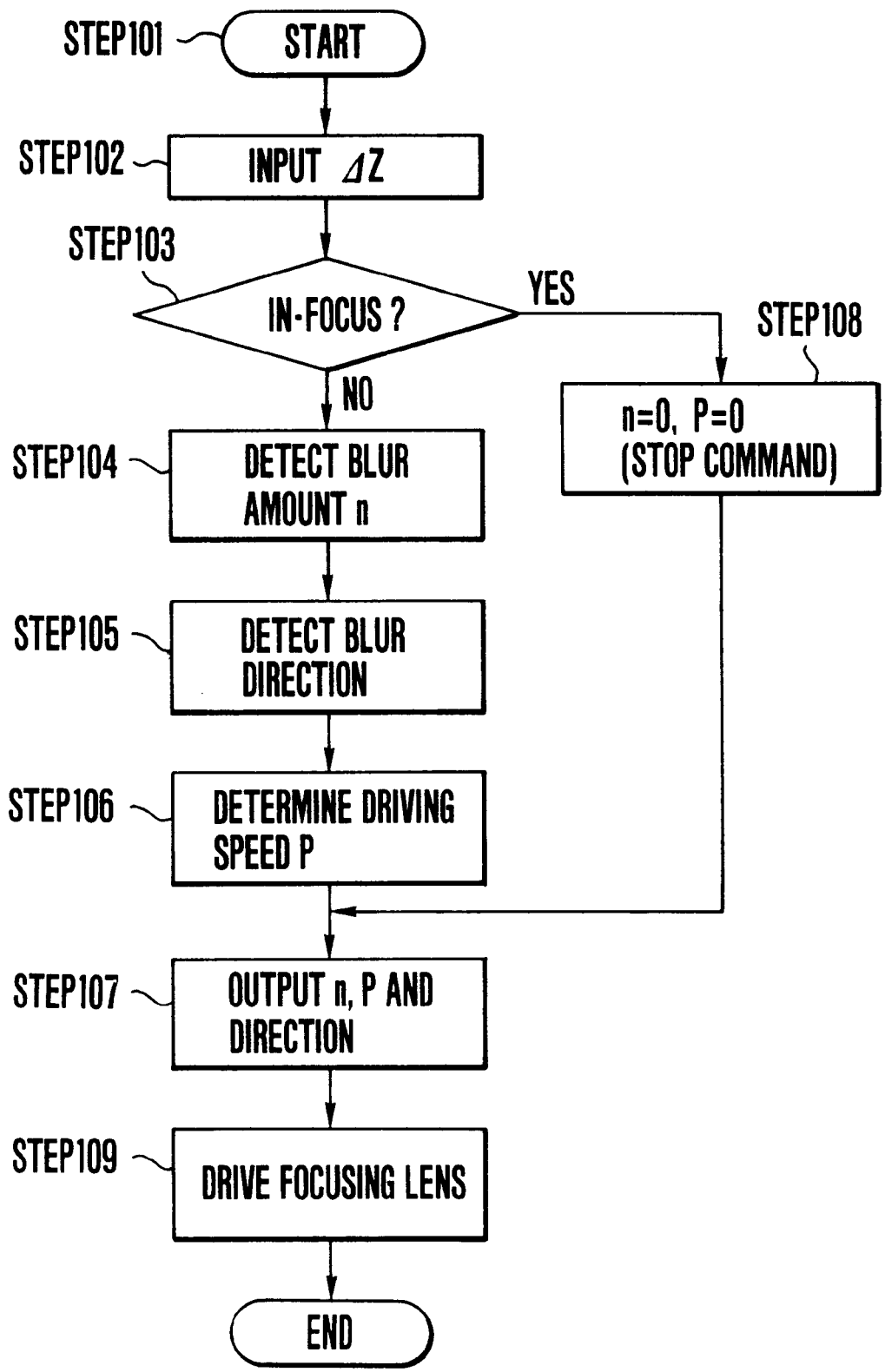
FIG. 9 is a flowchart illustrating the focus adjusting operation of a third embodiment of the invention.

Now assuming that the automatic focus adjusting device of the second embodiment shown in the block diagram of FIG. 6 is used in combination with means for communicating the above-identified three items of information, or the amount of movement of the lens, the speed of movement of the lens and the direction of movement of the lens between the lens and the camera, then the control operation is performed in a manner shown by a flowchart shown in FIG. 9. In FIG. 9, after the start at a step 101, the lens-side microcomputer 33 is informed of the detected values of the aperture size, focal length, etc. by the respective encoders, and the amount $\Delta Z$ of change of the diameter of a circle of confusion per unit movement of the lens is then computed in a step 102. The result is sent to the camera-side microcomputer 16 through the channel 13 (LTC).

Meanwhile, the camera examines whether the image is in focus or out of focus in a step 103.

If out of focus, the step 103 is followed by a step 104 where how much the image is in blur, or the amount by which the diameter of a circle of confusion has to change until the image is taken as sharpest (or a value of the aforesaid variable D) is determined.

In a step 105, the blurring direction, that is, which of the near focus and the far focus is occurring, is detected. Then, a proper value of the speed of movement of the lens (the before-described P) is indicated to the lens side in a step 106. In a step 107, the determined values of the amount of movement, the speed of movement and the direction of movement by the AF system are sent to the lens-side microcomputer 33. The lens 3 is then driven in a step 109. If the image is determined in the step 103 to be in focus, a step 108 follows where to stop the lens, the amount of movement and the speed of movement are set to "0". The process of FIG. 9 works by repeating the procedure of the step 101 to the step 109 so that the AF operation always goes on. Each time this work is repeated, the amount of change of the diameter of a circle of confusion is read out from the lens side. After that, whether or not the image is in focus is examined. If in focus, the lens stops at the step 108. If not in focus, the amount "n" by which the lens is to move, and the direction in which the lens is to move are determined by the output of the AF signal processing circuit 34 in the step 104 and the step 105. Further, in the step 106, the speed P at which the lens is to move is determined. As has been described in connection with the foregoing embodiments, the values "n" and P each are a function of $\Delta Z$. In the AF method of the second embodiment of FIG. 6 and the present embodiment shown in FIG. 9, because the required amount of movement until in-focus is known, it is desirable that the speed of movement of the lens is made as fast as possible. And, in this case, the maximum of the speed P can be made to increase within a range not to give stress to the system. Further, it is also possible that regardless of the detected values of the amount of deviation and the amount of change of the diameter of a circle of confusion, by taking into account the increase of the load just after the start of driving and the inertia just before the stoppage, the value P is decreased to a minimum for only these fractions of the period.

In such a manner, the values of the three items of information, the lens drive amount "n", the lens drive speed P and drive direction, are determined and transmitted as the drive commands to the lens side. Incidentally, the computing method or detecting method of the n, p and drive direction is similar to that shown in connection with the above-described first and second embodiments. So their explanation is omitted.

Figure 10:
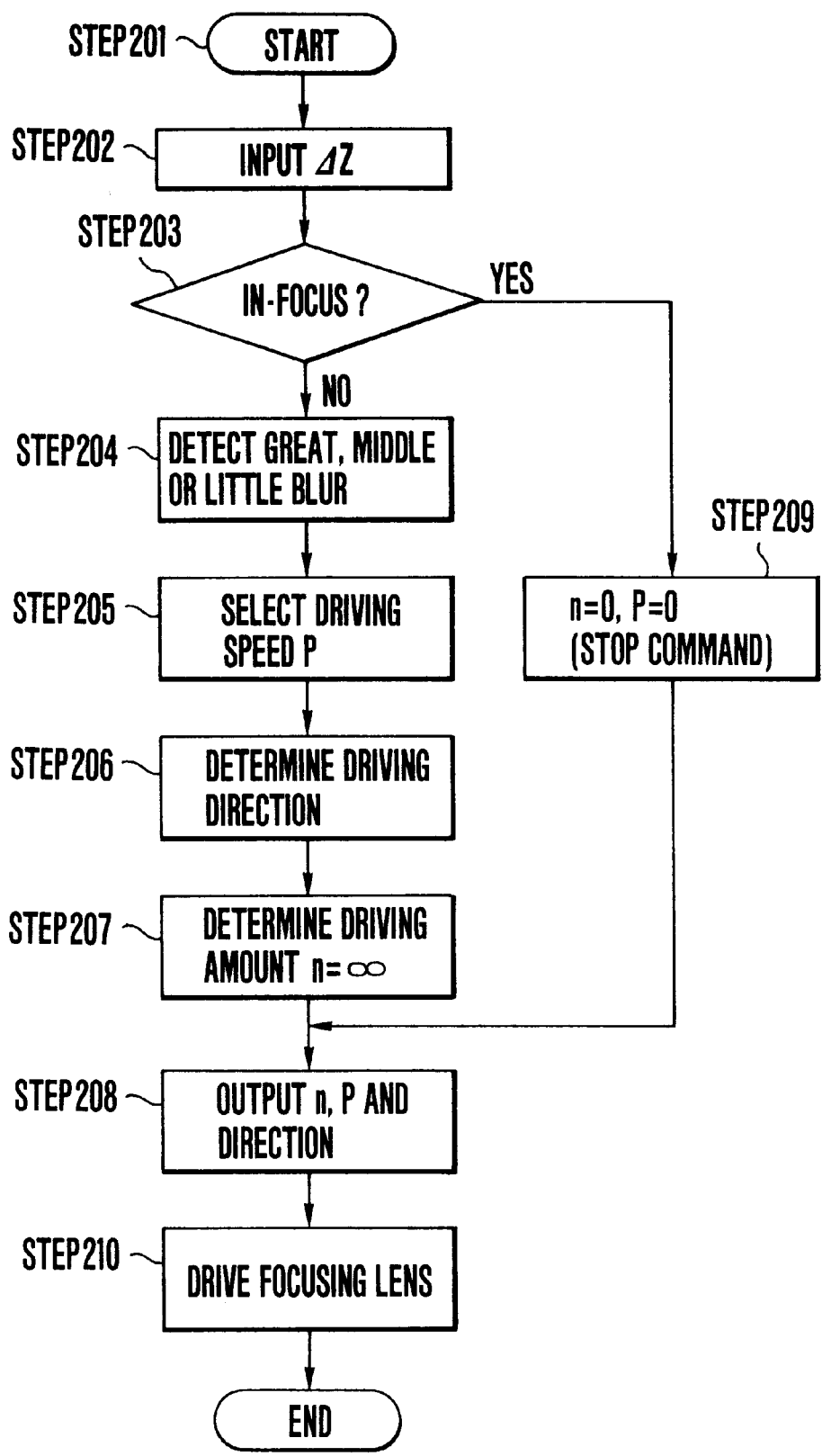
FIG. 10 is a flowchart illustrating another example of the same operation of the third embodiment of the invention.

FIG. 10 shows modification of the third embodiment of the invention as applied to another type of AF device using the video signal which has been described in connection with the first embodiment.

In FIG. 10, after an operation of the automatic focus adjusting device has been started at a step 201, the items of information representing the detected values of the aperture size and the focal length by the respective encoders on the lens side are read in the lens-side microcomputer 12 where likewise in a similar process to that described above, the amount $\Delta Z$ of change of the diameter of a circle of confusion per unit movement of the lens is computed in a step 202. The result is sent to the camera-side microcomputer 16.

In a step 203, on the camera side, whether the image is in focus or out of focus is determined by the AF signal processing circuit 25. If out of focus, the program advances to a step 204 where a similar evaluation of the blur amount to that described in connection with the steps 4 and 5 of the flowchart of FIG. 4 is done in three stages for the great, middle and small blur. A step 205 then follows where the one of the values of the drive speed P which corresponds to the blur amount in the converted form to the amount of change of the diameter of a circle of confusion is selected to indicate the motor for driving the lens (the step 6, step 7, step 8 and step 9 in the flowchart of FIG. 4). Subsequently the lens drive amount "n" until the point of in-focus is indicated in a step 207. But, with the AF device using the video signal as shown in FIG. 1, because it does not work likewise the second embodiment of FIG. 6, or the amount of deviation from the point of in-focus is not detected, to evaluate the required amount of movement "n" for reaching the in-focus state is impossible and, on practice of the automatic focus adjustment, unnecessary. So, in the present embodiment, the "n" must be set to infinity. Otherwise, a faulty operation that the focusing lens stops at the value "n" would occur. So, in actual practice, the "n" is set to the maximum possible value (for example, if "n" is expressed in 16 bits, it is FFFFhex), and then sent to the lens side, thus avoiding the above-described problem.

The information of the thus set values of the lens drive amount "n" and lens drive speed P and the lens drive direction is transmitted in a step 208 from the camera-side microcomputer 16 to the lens-side microcomputer 12 through the channel 14 (CTL), and the focusing lens 3 is controlled in accordance with that information.

Incidentally, if the image is determined in the step 203 to be in focus, the program advances to a step 209 where the lens drive amount "n" and the lens drive speed P each are set to "0", and the focusing lens 3 is stopped. Then, the step 208 follows.

By repeating such a procedure in a predetermined period, the automatic focus adjusting operation can always be carried out continuously.

Figures 11, 12:
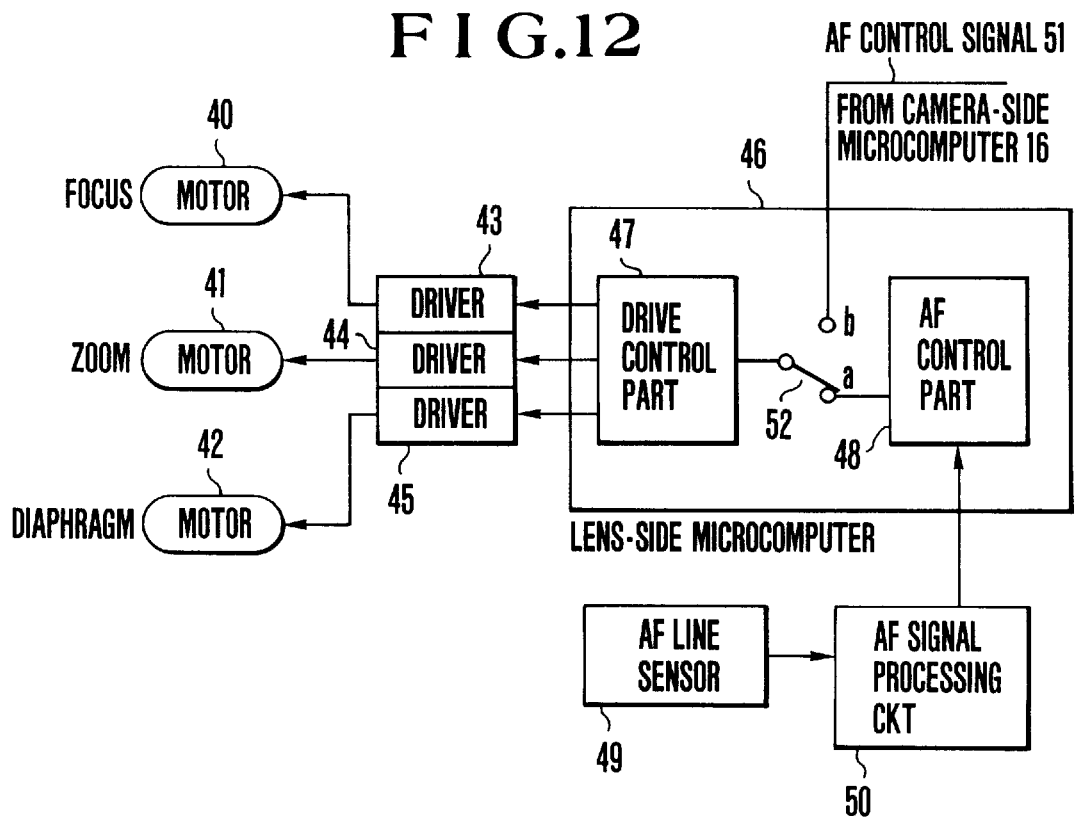
FIG. 11 is a scheme of the contents of information about which the lens and the camera in the third embodiment of the invention communicate with each other.
FIG. 12 is a block diagram of the main parts of the device to explain a fourth embodiment of the invention.

FIG. 11 shows the contents of communication of both directions between the lens and the camera for use in the AF control in the third embodiment. The content of communication from the lens to the camera is similar to that of the foregoing two embodiments. The content of communication from the camera to the lens has three items, namely, n, P and the drive direction.

As has been described above, even if the automatic focus adjusting device are of different types, it is possible to apply the invention to them. Also, though, in the third embodiment described above, for the systems of different automatic focus adjusting types, the respective individual flowcharts of FIG. 9 and FIG. 10 are used to explain them, these may be selected depending on the combination of the lens and the camera is discriminated by the camera-side microcomputer or the lens-side microcomputer so as to optimize the control operation. Hence, it is possible to make one and the same system operate with the selection of the control processes of FIG. 7 and FIG. 8.

In the so far described embodiments, the amount ΔZ of change of the diameter of a circle of confusion is periodically read. But, because, on the lens side, changes of the amount ΔZ can be detected in sequence, another method may be considered that whenever the amount ΔZ has changed, it is transmitted to the camera side. Also, though these embodiments have been described in connection with the type in which the focusing lens is moved to obtain the sharp image, the invention is not confined to this and is applicable to any other types in which a single lens or a plurality of lenses, or other elements are moved to obtain the sharp image.

A case of combining a lens unit having the automatic focus adjusting device and the microcomputer for controlling it incorporated therein with the camera is next described by reference to FIG. 12.

FIG. 12 shows the arrangement of the main parts of the lens unit. The focusing lens, the zoom lens and the diaphragm are operated by respective electric motors 40, 41 and 42. Drivers 43, 44 and 45 drive the motors 40, 41 and 42 respectively. The lens-side microcomputer 46 has a drive control part 47 for controlling the drivers 43, 44 and 45 to drive all the motors and a lens-side automatic focus control part 48.

Also, a reference numeral 49 denotes a sensor for focus information detection such as line sensor. The output of the sensor 49 is subjected to prescribed signal treatments by an AF signal processing circuit 50 whose output representing whether the image is in focus, or out of focus, the amount of deviation from the point of in-focus, the direction of deviation, etc. is supplied to the aforesaid automatic focus control part 48.

A focus control signal from an automatic focus adjusting device (in fact, a microcomputer) arranged in the camera is supplied to the lens through an AF control signal line 51. A switch 52 selects either the AF control signal or the output of the automatic focus control part 48 in the lens-side microcomputer 46 for connection to the drive control part 47 for controlling the drivers for driving the lenses. This switch 52 may be operated either manually, or in automatic response to a command from the lens-side or the camera-side microcomputer 46 or 16 depending on the situation of the object.

Therefore, when the switch 52 is set in its "b" position to select the camera-side AF control signal, the lens-side focus adjusting operation can be carried out by the AF control signal from the camera side (the camera-side control). Also, when the switch 52 is moved to its "a" position to select the automatic focus control part 48 side, the lens side alone suffices for carrying out the automatic focus adjusting operation irrespective of the camera side (self-complete type).

And, in a case where the focus adjustment is carried out by the AF control signal from the camera side, similarly to each of the foregoing embodiments, the detection signal from the line sensor is brought through the AF signal processing circuit 50 into the lens-side microcomputer 46, and the amount of deviation is converted to a change of the diameter of a circle of confusion which is then sent through the transmission line LTC to the camera side.

Therefore, regardless of the combination of the lens and the camera, the optimum control depending on its pattern can be made.

As has been described above, the lens side and the camera side are made to communicate each other by using the amount ΔZ of change of the diameter of a circle of confusion as the parameter when the AF control information is transmitted. Therefore, for the various combinations of the lenses and the camera, a common base is established by using the formulated signal transmission. This is very advantageous for compatibility and versatility.

As has been described above, when the automatic focus adjustment is carried out by controlling the lens system with the use of the AF system, the conversion of the desired amount of movement of the lens or the image sensor effects a result that without complicated calculations, the communication, the control coordination and the commonness between a plurality of focus detecting types and a plurality of lens systems become possible to enhance, thus being very advantageous as the automatic focus adjusting device in the interchangeable lens system.

According to the above embodiment, the lens side and the camera side each are provided with the microcomputer and arranged to communicate data with each other. After this, the amount ΔZ of change of the circle of confusion which varies as the drive means for moving the lens group for focus adjustment, for example, AF motor rotates a predetermined amount, (for example, the rotation by one pulse of the pulse disc for detection such as the rotation phase) is computed on the basis of the focal length f and the aperture value F by the lens-side microcomputer, and then transmitted from the lens side to the camera side through the mount contact. The camera-side microcomputer reads in this value and at the same time selects the optimum speed of expansion of a circle of confusion depending on the degree of defocus (sharp focus, great blur, middle blur and little blur) determined by the AF signal processing circuit. And, in order that the actual speed coincides with this selected one, a command of the AF motor rotation speed to the drive means of the lens side is carried out based on the amount ΔZ. That is, in order that even when the lens characteristic has changed, the AF system correctly functions, the necessary condition is to always maintain constant not the speed of rotation of the drive means but the relation between the speed of change of a circle of confusion and the degree of defocus.

It is to be noted that though shown in the foregoing embodiments too, when the focal length shortens and the aperture value increases (the aperture size decreases), the use of the constant equal speed of change of a circle of confusion to that when in the other condition leads to a possibility of necessitating a very fast movement. In such a case, it is substituted for by the maximum speed in the range of no problem on actual practice.

The above-described idea is reviewed here. In the case of the ordinary or 4-component zoom lens, the lens group for focus adjustment is the first lens group or front lens. Letting the focal length of this first lens group be denoted by $f_F$, the position sensitivity $S_0$ of the front lens at the telephoto end (the focal length $f_T$) is expressed by $S_0=(f_T/f_F)^2$. Also, the position sensitivity S at an arbitrary focal length f becomes $S=S_0\times(f/f_T)^2$ as shown by the aforesaid equation (1). When the lens group for focus adjustment axially moves an amount $\Delta A$ and the aperture value of this time is F, the amount $\Delta Z$ of change of a circle of confusion by this amount $\Delta A$ likewise the aforesaid equation (2) becomes:

$$\Delta Z = \Delta A \times S_0 \times (f/f_T)^2/F$$

That is, to make constant the speed of expansion of a circle of confusion in response to the aforesaid blur state means to make the amount $\Delta Z$ a certain constant value in a certain time t. For this purpose, because in the above equation the values $S_0$ and $f_T$ are constants, it is nothing but to make the amount $\Delta A$ variable depending on the focal length f and the aperture value F. That is, $$\Delta A = f(\Delta Z, f, F)$$

Here, the amount $\Delta Z$ is a value the AF signal processing circuit defines depending on the aforesaid degree of defocus.

From the above, it is understandable that to make the amount $\Delta A$ in t (sec.), or $\Delta A/t$ (mm/sec.) that means the moving speed of the lens group for focus adjustment to vary with the focal length f, the aperture value F and the degree of defocus are necessary on the AF system in the camera etc. employing interchangeable lenses.

However, it has been found by the later investigation and development that the technique owing to the above-described embodiment has room left for further improvement. That is, in the above-described embodiments, it is by the lens-side microcomputer that the amount of change of the diameter of a circle of confusion by the prescribed rotation of the motor depending on the focal length f and the aperture value F is computed.

However, on consideration of the interchangeable lens system, it seems to be general that a plurality of lens units are selectively used in releasable attachment to the camera body.

Therefore, it is not preferable to give the various computing functions to the lens side. It is desirable that the control means of the lens side is in simple form. In such an interchangeable lens system, it is considered that many functions should be concentrated in the microcomputer of the camera side.

With such a point in mind, the above-described first to fourth embodiments have been improved to provide a focus adjusting device suited to be used in video cameras or the like. This is shown in a fifth embodiment.

The construction and arrangement of the circuit blocks of the present embodiment is similar to that of the first embodiment shown in FIG. 1 and FIG. 2. So, an explanation of its circuit structure is omitted. The present embodiment has a characteristic feature in its control operation.

FIG. 13 is an example of the content determined as the drive content of the drive means of the lens group for focus adjustment of the lens side to practice the fifth embodiment of the invention. n is defined by numerals of 9 stages from 0 to 8, and the respective contents are stipulated to define the speed $\Delta Zn$ of expansion of a circle of confusion by the condition of the full aperture at the telephoto end. In principle, therefore, when a value of the "n" is indicated from the camera side, the drive means moves at a corresponding speed to the speed $\Delta Zn$ of expansion (in the telephoto end at full aperture) of a circle of confusion. That is, for example, the speed of n=1 does not need to become $\Delta Zn=0.32$ except when in the telephoto end at full aperture. Even if the speed at that time is the same as n=1, the speed $\Delta Zn$ takes a smaller value by the following computation formula:

$$\Delta Zn = \Delta Zn \times (f/f_T)^2 \times (F/F_0)$$

Conversely speaking, if "n" is the same, the speed of rotation of the distance ring does not depend on the focal length f and the aperture value F, being the same as far as that lens is concerned. Therefore, when a lens in which, of the lens specification, the focal length $f_T$ of the telephoto end and the full aperture F-number $F_0$ differ is used, because the value of the speed $\Delta Zn$ is constant, the time necessary to rotate the distance ring from infinity to, for example, 1.2 m is caused to differ.

FIG. 14 shows the speed at which the lens group for focus adjustment of each of lenses of a full open F-value of 1.4, the closest focusing distance of 1.2 m and $f_T=100$ mm, $f_T=72$ mm and $f_T=54$ mm moves in terms of the required time. The shorter the focal length, the shorter the moving time of ∞~1.2 m and the faster the speed becomes. This is natural even from thinking of the fact that the longer the focal length, the shallower the depth of field becomes. Here, suppose f=54 mm and n=8, then it takes 0.6 sec. to move ∞~1.2 m. This is not typical for the lens of the video camera. So, the round-marked ones of the values of "n" for the lenses, namely, n=8 for $f_T=100$ mm, n=7 for f=72 mm, or n=5 for f=54 mm is taken as the maximum value $n_{MAX}$, and faster speeds than this are prohibited from occurring. The method of dealing $n_{MAX}$ will be explained by taking an example in connection with the explanation of a flowchart to be described later.

FIG. 15 shows how the speed $\Delta Zn$ varies when the diaphragm stops down with the lens of, for example, F/1.4 at full open aperture, while holding the focal length in the telephoto end. Concerning the aperture value F, the numerical value gets smaller in ratios of the first order.

FIG. 16 is an example of assignment of the numerals of what are referred to as coefficients $K_F$ and $K_f$ to all the zones formed by the encoders for the F value and the focal length f (mm) capable of dividing the F value to 5 stages in each 2 EV and the f (mm) range of 10 to 110 to 7 stages, or a sequence in $x\sqrt{2}$ progression. In the communication from the lens side to the camera side, f (mm) and F value may be transmitted not as they are, but as the values of the coefficients $K_F$ and $K_f$.

FIG. 17 shows a case of realizing the variation of the speed in the stages of n=1 to 8 by controlling the duty of the drive pulses for the pulse motor for driving the lens where the duty ratio is related to its drive pattern. It is to be noted that variation of the speed of the motor may otherwise be made by the voltage control, for example. Also, if the motor has the rotation detecting means such as the pulse disc, it is also possible to finely adjust the rotation by feeding its output back to the set value of the duty ratio or voltage. From the aforesaid coefficients $K_F$ and $K_f$ of FIG. 16, $K=K_F+K_f$ is set forth. Then, for example, when shooting with f=54 mm and F/2.8, $K_f=3$ and $K_F=2$. Therefore, K=3+2=5 results. Also, the value of the K at the telephoto end and full aperture of any lens is called $K_t$. Since this value is a constant intrinsic to the respective individual lens type, it becomes possible to store the lens type in the lens-side microcomputer. For example, in the case of a lens of $f_T=54$ mm and the F-number at full aperture or $F_0=1.4$, Kt=3 is stored. In the case of another lens of $f_T=100$ mm and $F_0=1.2$, Kt=2 is stored.

FIG. 18 shows the values of $\Delta K=K-Kt$ as the function of the combination of the focal length and F-number in each zone for a lens of $f_T=100$ mm and $F_0=1.4$. That is, this lens when in the telephoto end at full open aperture has a value of Kt=2. When shooting is being performed with, for example, f=54 mm and F=2.8, K=5. Therefore, $\Delta K=5-2=3$ results.

FIG. 20 likewise shows the values of $\Delta K$ in the case of a lens of $f_T=54$ mm and $F_0=1.4$. As is apparent from the foregoing, with the lens of FIG. 18, when in a photographic situation that requires, for example, f=30 mm and F=5.6, $\Delta K=5$ results. With the lens of FIG. 20, on the other hand, when in the same settings of f=30 mm and F=5.6, $\Delta K=3$ results. In such a manner, the value of $\Delta K$, even when in the same focal length and F-number settings, is caused to differ with lenses of different maximum focal length and full aperture value $F_0$. Now suppose the AF device used in the present embodiment is capable of discriminating the little blur, middle blur and great blur and the sharp focus from one another as has been described before. Also, suppose, of these, the little blur or the middle blur when to focus requires that the speed of expansion of a circle of confusion in this AF device takes 0.32 mm/sec. or 0.45 mm/sec., respectively. From FIG. 13, this means that when in the telephoto end at the full aperture, the AF motor rotates at a speed of n=1 for the little blur, or n=2 for the middle blur. That is, when $\Delta K=0$, n takes "1" for the little blur, or "2" for the middle blur. Also, as shown in FIG. 15, when the diaphragm opens up from 1.4 to 2.8 or by two stops, n=3 for the little blur or n=4 for the middle blur is set to effect the same result or 0.32 mm/sec., or 0.45 mm/sec., respectively. At this time, $\Delta K=1$. The relationship of such $\Delta K$ with the values of "n" for the little and middle blurs is shown in FIG. 19. This table for selecting one of the values of "n" is common with any other lens types.

It should be noted that in the so far described embodiment, the focal length f (mm) and the F-number F are assumed to be detected in discrete values. The F values are made form a sequence in ×2 progression (1.4, 2.8, 5.6, . . . / in other words, in every two stops) and the f values are made to form a sequence in $\times\sqrt{2}$ progression ($10\times\sqrt{2}=14$, $14\times\sqrt{2}=20$, . . . ). Therefore, although "n" for the little blur takes, for example, 1, 3, 5, 7 and so on as shown in FIG. 19, the invention is not confined to the numerical values of these tables. Depending on the design, it is also possible to define a different magnification progression from that in the present embodiment.

Figure 21:
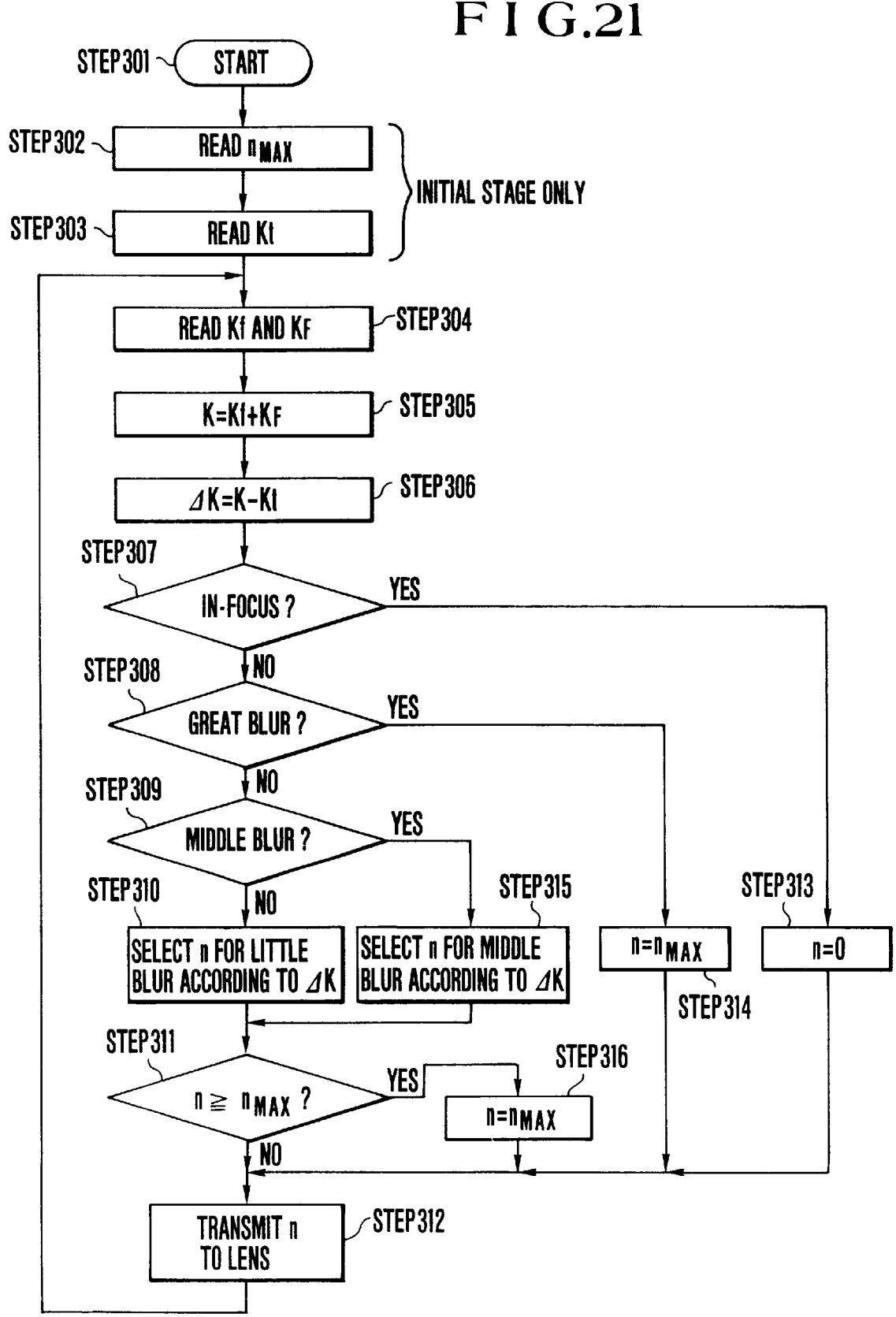
FIG. 21 is a flowchart illustrating the control operation of the camera-side microcomputer in the fifth embodiment of the invention.

FIG. 21 is a flowchart taken to explain the control operation of the camera-side microcomputer of the invention. The program begins with a start step 301. In steps 302 and 303, as the lens unit has been attached to the camera body, this initial condition is communicated from the lens side to the camera side by means of the highest speed $n_{MAX}$ of the motor for AF and Kt. The $n_{MAX}$ represents the one of the speed numbers n=0 to 8 which coincides with the highest speed the drive means of that lens can actually realize. A step 304 and those that follow are a flow which, after that, repeats itself in a period of 1/30 sec. in synchronism with the frame period. In the step 304, the values of $K_f$ and $K_F$ are read in from the lens. Instead of this, the values of the focal length f (mm) and the aperture size F are directly read in and then converted to the corresponding values of $K_f$ and $K_F$ within the camera-side microcomputer. In the step 305, $K=K_f+K_F$ is computed. Conversely, it is also possible that after this computation has been done in the lens-side microcomputer, the camera-side microcomputer then reads in the result. But, for this case, the step 304 should be omitted. In a step 306, the aforesaid formula or $\Delta K=K-Kt$ is computed. Whether the image is in focus or out of focus and, when out of focus, whether the blurring is little, or middle, or great, are then discriminated in steps 307 to 309. As a result, if in focus, n=0 is set (the motor is stopped). If in the great blur, "n" is set to the maximum value $n_{MAX}$. Also, if in the little blur, or the middle blur, "n" is set to an optimum value depending on the value of $\Delta K$ by the conversion table of FIG. 19 (a step 310 or a step 315). In a step 311, whether or not the set "n" in the step 310 or 315 is above the highest speed $n_{MAX}$ is determined. If $n \geq n_{MAX}$, this speed cannot be attained, $n=n_{MAX}$ is set in a step 316. Since, in such a manner, "n" has been set to the corresponding value to the given case, the information of "n" is transmitted from the camera side to the lens side in a step 312.

Responsive to this information, the lens-side microcomputer drives the lens group for focus adjustment in a drive pattern as, for example, shown in FIG. 17.

The above-described embodiment is to convert the focal length f and the F-number F to the values of $K_f$ and $K_F$ in order to select the optimum speed number. By the way, in order to cause the aforesaid K to change its value by 1, the focal length has to have changed $\times\sqrt{2}$, or the F-number F has to have change ×2. So, instead of making conversion to $K_f$ and $K_F$, from the following two equations:

$$f_T = f \times (\sqrt{2})^m$$

$$F = l \times F_0$$

the value of l and m are computed. Thus $\Delta K=m+l$ can also be derived in another form. For example, with the lens of $f_T=100$ and $F_0=1.4$, when f=56 and F=5.6, m and l, from the above equations, have values of m=2 and l=2 respectively. Therefore, $\Delta K=4$ is obtained. Hence even such a form of system assures that an equivalent result can be obtained.

As has been described above, in the AF system applied to the camera having interchangeable lenses, as a common definition of all the lenses concerning the drive speed of the lens group for focus adjustment, use is made of such a drive speed that in the condition that the change of a circle of confusion resulting from the predetermined amount of movement of the focus adjusting lens becomes maximum (in many cases, in the telephoto end at the full open aperture), the speed of change of a circle of confusion becomes a certain predetermined value. And, this speed is assumed to be able to take a plurality of different values. Under such a definition, determination of the speed is made in such a way that, depending on the information of the blurring of the object image and the in formation of the focal length f and F-number F, the camera-side microcomputer selects the optimum speed out of the aforesaid plurality of values. Therefore, the contents of the computation for obtaining the speed can be deleted to large extent. Particularly, the scale of the lens-side microcomputer can be largely reduced. This produces a great practical advantage when the AF system in the interchangeable lens system is formed.

Next, a sixth embodiment of the invention is described.

The present embodiment discloses a video camera in which optimization of the combined operation of automatic focus adjustment and zooming has been achieved.

At first, the background techniques on the zoom lens are described. The zoom lens of which the focusing function and the function of the compensator for compensating for the image shift with zooming are made compensated by the same compensation lens group is proposed in, for example, Japanese Patent Publication No. Sho 52-15226 or Japanese Patent Publication No. Sho 56-47533. In such a zoom lens, as compared with the zoom lens of the type in which the aforesaid two functions are compensated by separate lens groups, the size of the lens system can be minimized, and it becomes possible to shorten the minimum photographable object distance.

In the Japanese Patent Publication No. Sho 52-15226, based on the position information of the variator lens, the position to which the compensator lens group is to move is obtained by the computing process.

Meanwhile, in the Japanese Patent Publication No. Sho 56-47533, the image shift that occurs when the image magnification is varied is detected by using, for example, the automatic focus detecting device, when the process for moving the compensator lens group is carried out.

By the way, in the inventions of the these publications, if the aforesaid process were carried out real time fashion, no problem would arise. But, in actual practice, it takes not a little time. Therefore, particularly when zooming, the movement of the variator lens cannot immediately be followed by movement of the compensator lens. Therefore it becomes difficult to maintain the in-focus state.

Japanese Laid-Open Patent Application No. Sho 62-296110 discloses a technique of compensating for this response delay of the automatic focus detecting device. According to this publication, a plurality of zones determined by the position relationship of the variator lens and the compensator lens are set in, and, for every one of these zones, the corresponding unit movement of the compensator lens to the predetermined movement of the variator lens is previously memorized. From the position information of the variator lens and the compensator lens at a time when the predetermined movement of the variator lens has been detected, the unit movement of the compensator lens based on the one of the zones which is set from this position information, and further the zooming direction and the information of the blur detected by the automatic focus adjusting device, the aforesaid unit movement is then corrected. By this corrected movement, the aforesaid compensator lens is moved. Thus, the maintenance of the image plane at the constant position is achieved.

Incidentally, it is known that the lens concerning the focusing is made reciprocate to the near focus direction and then to the far focus direction, and based on the resultant change of the video signal, whether the lens concerning the focusing lies in the near focus position or in the far focus position is discriminated as disclosed, for example, in Japanese Laid-Open Patent Application No. Sho 55-76309, Japanese Laid-Open Patent Application No. Sho 59-133783, and others.

In the invention of the aforesaid Japanese Laid-Open Patent Application No. Sho 62-296110, if whether the image in the middle of the course of moving the variator lens group by the predetermined distance, or at a time during zooming, is blurred to the near focus or the far focus is clear, to relatively smoothly reach the in-focus state can be expected. But, when the photographic situation where it takes a long time to discriminate between the near focus and the far focus is encountered, it becomes difficult to bring the performance into full play. Particularly when zooming from the wide-angle side to the telephoto side, production of a blurring of the image from the middle of the zooming course is considered to be possible to frequently occur on the principle related to the depth of field.

The present embodiment is that the automatic focus adjusting device of which the automatic focus adjusting operation has been optimized to a plurality of lenses of different various features to one another, is further applied to the zoom lens. Particularly in application to the zoom lens position control device, an optimization is achieved.

The form and operation of the present embodiment are next described by using the drawings.

Figure 22:
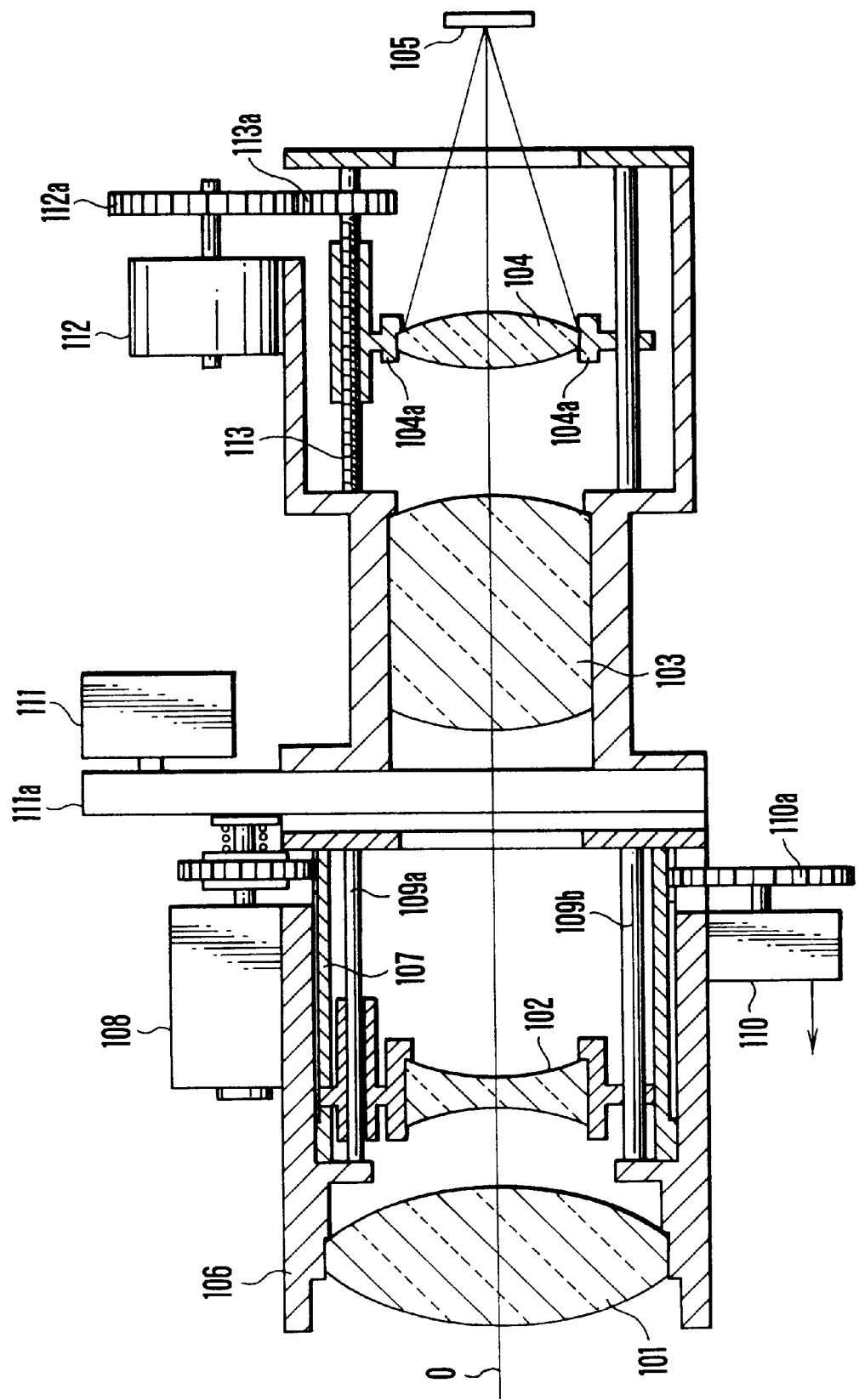
FIG. 22 is a longitudinal section view of the zoom lens system of a sixth embodiment of the invention.

FIG. 22 is a sectional view of the zoom lens system according to the invention. Reference numerals 101, 102, 103 and 104 constitute a photographic optical system. In particular, the variator lens group 102 (hereinafter referred to as the "V" lens group) moves along an optical axis to vary the image magnification. The rear relay lens group 104 (hereinafter referred to as the "RR" lens group) has both of the focusing function and the function of compensating for the shift of the image plane resulting from the movement of the V lens group 102 and takes the rearmost position in the system. When the aforesaid photographic optical system is employed in a video camera, an image sensor 105 such as CCD is installed within the camera body. A lens barrel 106 includes a cam tube 107 having a camming slot cut therein by which the movement of the V lens group 102 is controlled and restrained when the cam tube 107 is rotated by a drive motor 108. The V lens group 102 are guided by guide bars 109a and 109b. An absolute encoder 110 has a gear 100a meshing with a geared portion of the cam tube 107 to detect the angular position of the cam tube 107, or the absolute position of the V lens group 102, and produces an output representing one of the sixteen zones to which the zooming range is divided.

Figure 23:
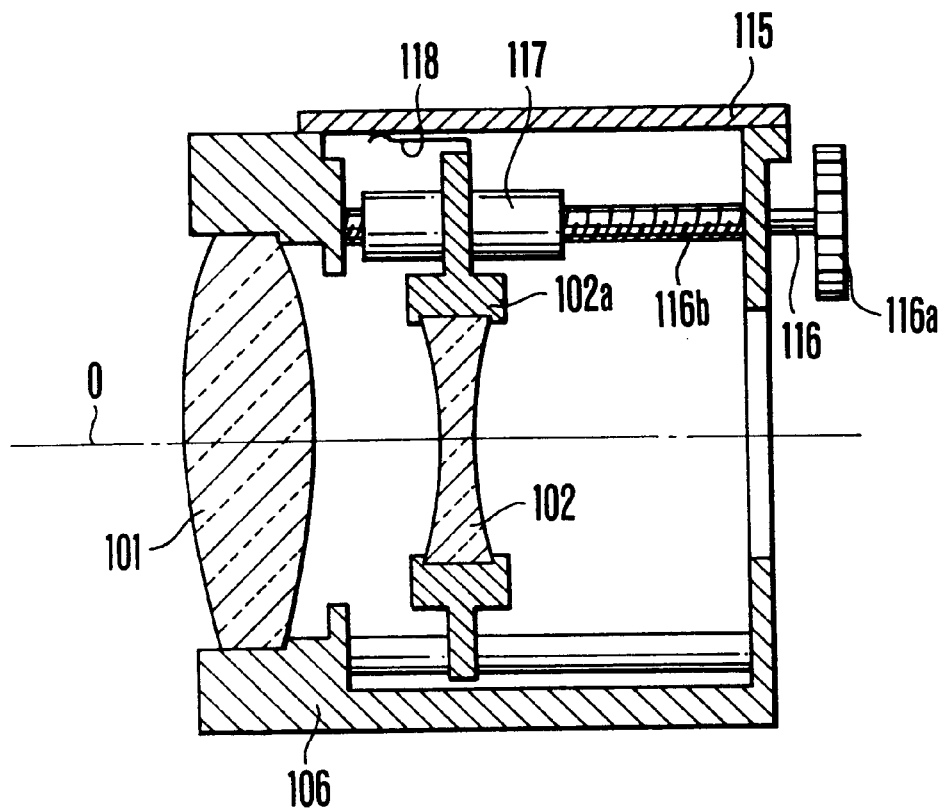
FIG. 23 is similar to FIG. 22 except that the drive mechanism of the V lens group is illustrated.
Figure 24:
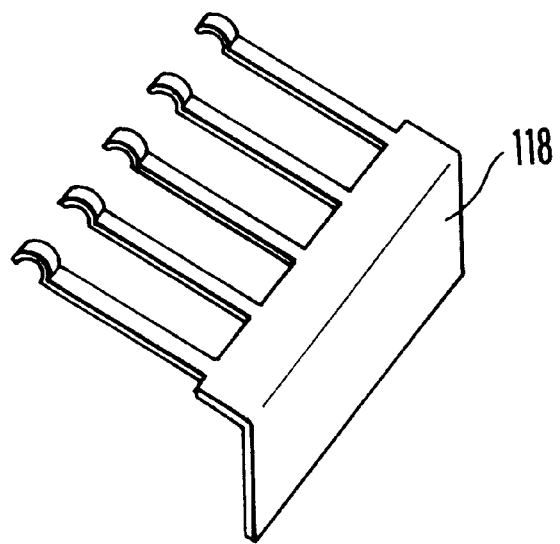
FIG. 24 is a perspective view of the brush constituting part of the position detector for the V lens group.
Figures 25, 26:
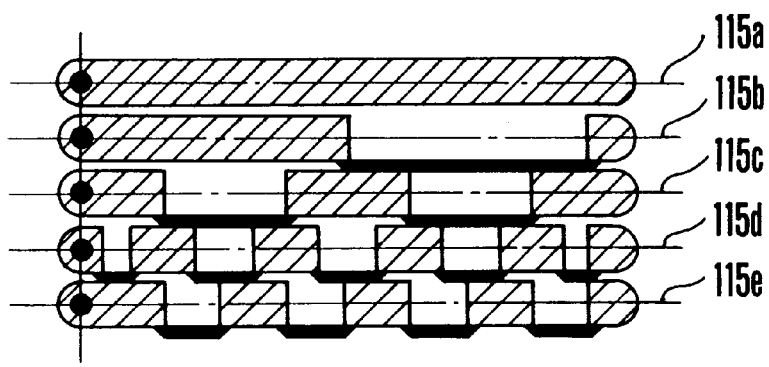
FIG. 25 is a top view of the substrate constituting part of the same detector.
FIG. 26 is a truth table of the bits of the signal representing the position of the V lens group.

FIG. 23 shows another example of detection of the absolute position of the V lens group 102, where the parts denoted by the same reference numerals as those shown in FIG. 22 fulfill the same functions. A gear 116a receives the driving output of the drive motor 108. The gear 116a is fixedly mounted on one end of a rotary shaft 116 having screw-threads 116b formed in the outer surface thereof. A moving member 117 formed in unified form with a lens holding member 102a engages this worm screw 116b so that the V lens group 102 is able to move along the optical axis. A brush 118 shown in greater detail in FIG. 24 is fixedly secured to the lens holding member 112a. Meanwhile, the lens barrel is provided with a Gray code board 115 having electrode patterns 115a to 115e shown in FIG. 25. And, each brush terminal of the brush 118 slides on the Gray code board 115. By this, the absolute position of the V lens group can be detected. In the embodiment shown in FIG. 23, the range of variation of the image magnification is divided into sixteen zones. Incidentally, the electrode pattern 115a on the substrate is grounded. Also, FIG. 26 shows 16-divided binary coded outputs.

Returning to FIG. 22, a reference numeral 111 denotes a motor for driving a diaphragm mechanism 111a known to those skilled in the art. A pulse motor 112 moves the RR lens group 104. A guide bar 113 for guiding the RR lens group 104 has a worm gear cut in the outer surface thereof and is rotated by the pulse motor 112 through its drive gear 112a and a gear 113a to move a holding member 104a of the RR lens group 104 along the optical axis.

Figure 27A:
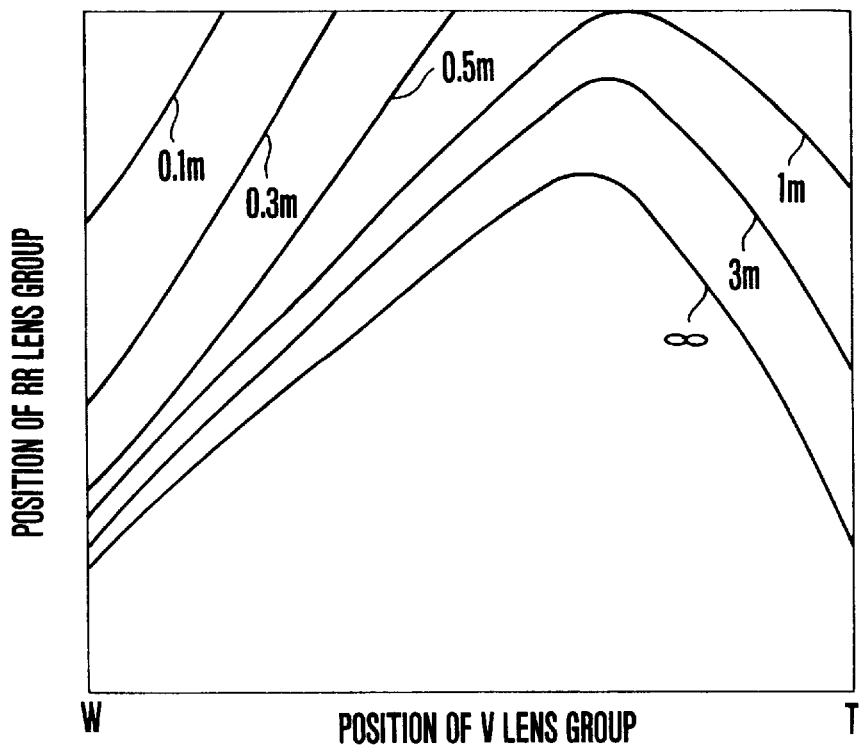
FIG. 27(A) is a graph of movement characteristic curves according to object distances of the V lens group and the RR lens group of the optical system according to the present embodiment.

Now, the optical system according to the invention, that is, the lens system of the so-called rear focus zoom type in which the focusing function and the compensator's function are performed by one compensation lens group (RR lens group) differs from the conventional common zoom lens system, that is, the lens system of the type in which the focusing lens group and the compensator lens group exist in separation from each other so that the locus of motion of the compensator lens group can be determined unequivocally, in that the movement of that compensation lens group depicts different loci from one another as the object distance varies. This behavior is shown in FIG. 27(A) where the axial position of the V lens group is taken in the abscissa and the axial position of the RR lens group is taken in the ordinate. W at the left end represents the wide angle end, and T at the right end represents the telephoto end. As is understood from this graph, the shape and position of the locus of movement of the RR lens group vary as the function of the object distance.

Figure 27B:
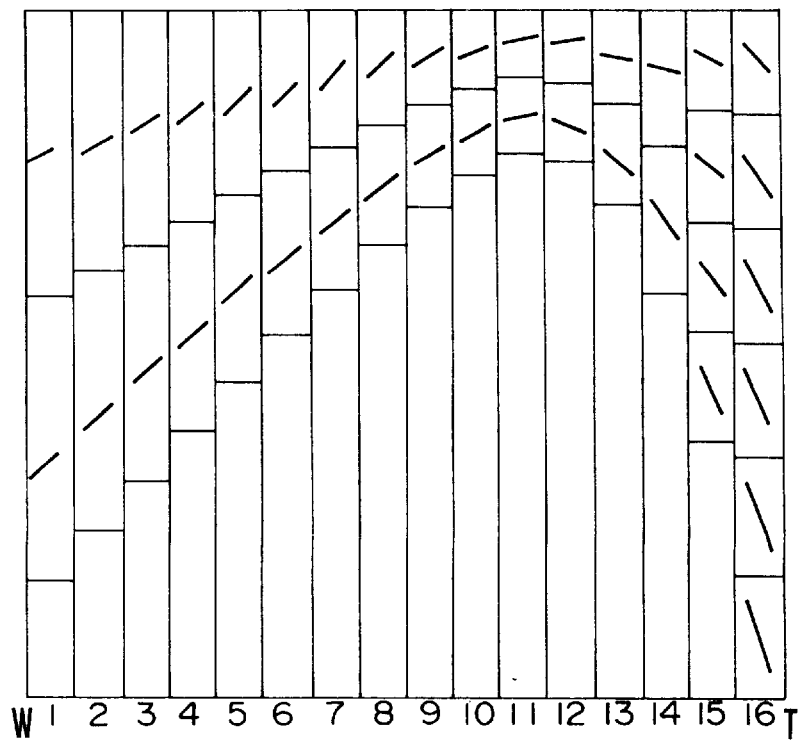
FIG. 27(B) illustrates division of the range of movement of FIG. 27(A) into zones.

In the case that the automatic focus detecting device is actually installed in the zoom system having such a characteristic, because it takes the automatic focus detecting device not a little time to process the signal, it becomes difficult that in response to the continuous movement of the V lens group 102 when zooming, the RR lens group 102, while preserving the in-focus state, is made to follow up in real time fashion. So, in the present embodiment, with such a problem in mind, as shown in FIG. 27(B), the range of focusing movement is divided to a plurality of zones whose lengths differ according to the characteristic curve shown in FIG. 27(A), and a representative speed (reference speed) of the RR lens group 104 for each zone is previously memorized. It should be noted that in the present embodiment, there is a premise that when zooming, the V lens group 102 moves at a constant speed. Also, in the present embodiment, the range of zooming movement of this group is divided into sixteen zones which correspond to the respective aforesaid 16-divided outputs of the position detecting device for the V lens group 102. Therefore, if the in-focus state is established before the start of zooming, the speed of movement of the RR lens group 104 is then determined from the positions of the V lens group 102 and the RR lens group 104 and the zooming direction. Hence, in principle, the response delay of the automatic focus detecting device can be compensated for.

FIG. 28 shows an electric circuit diagram to be combined with FIG. 22. When a main switch 242 is turned on, a power-on reset circuit 243, as has been described above, resets the step motor 112 to "0" address.

A zoom actuation detecting part 241 has zoom switches (T, W) on manipulation to send information representing the history of their momentary positions to a CPU 230. In the CPU 230, the actuation of the zoom switches (T, W) becomes a trigger, causing the position of the V lens group 102 to be detected by the absolute encoder 110 or by using the brush 118 and the substrate 115. Its output is passed through a zoom encoder reading circuit 234 to the CPU 230. What number of pulses the angular position of the step motor 112 is spaced from the "0" reset position is counted by a step motor drive pulse counter circuit 236, and is transmitted to the CPU 230. These two items of lens position information are compared with the numerical values of a zone data memory 233 to determine the present zone. The representative speed (reference speed) of this zone is then read out from the list of speed data such as those shown in FIG. 27(B) stored in a speed data memory 231. It is to be noted that in this memory 231, a relative speed which will result in the near focus to the zone representative (reference) speed, and another relative speed which will result in the far focus are also stored. Further, depending on whether the history of the momentary positions of the zoom switches (T, W) of the zoom actuation detecting part 241 is from wide-angle side to the telephoto side, or from the telephoto side to the wide-angle side, the direction in which the step motor 112 is to rotate is read from a direction data memory 232 into the CPU 230. In the CPU 230, from the contents read from these data memories and the blur information read from the AF device 235 through the image sensor 239, the direction and speed in and at which the step motor 112 for driving the RR lens group 104 is to move are determined and, at the same time, depending on the actuation result of the zoom switches (T, W), the direction in which the motor 108 for driving the V lens group 102 is to rotate is determined. After that, the CPU 230 produces an output which is applied to the step motor drive pulse output circuit 237 and another output which is applied to the zoom motor driver 239 in such timed relation that the two motors 112 and 108 start to rotate at almost the same time.

Figure 29A:
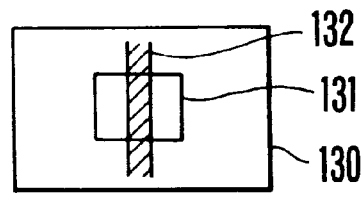
FIGS. 29(A), 29(B) and 29(C) illustrate the operational principle of the focus detecting device according to the present embodiment.
Figure 29B:
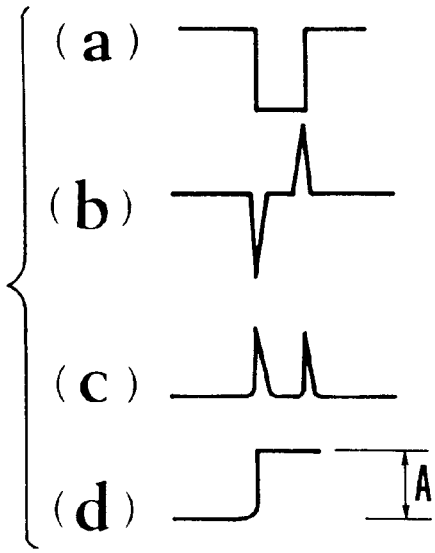
Figure 29C:
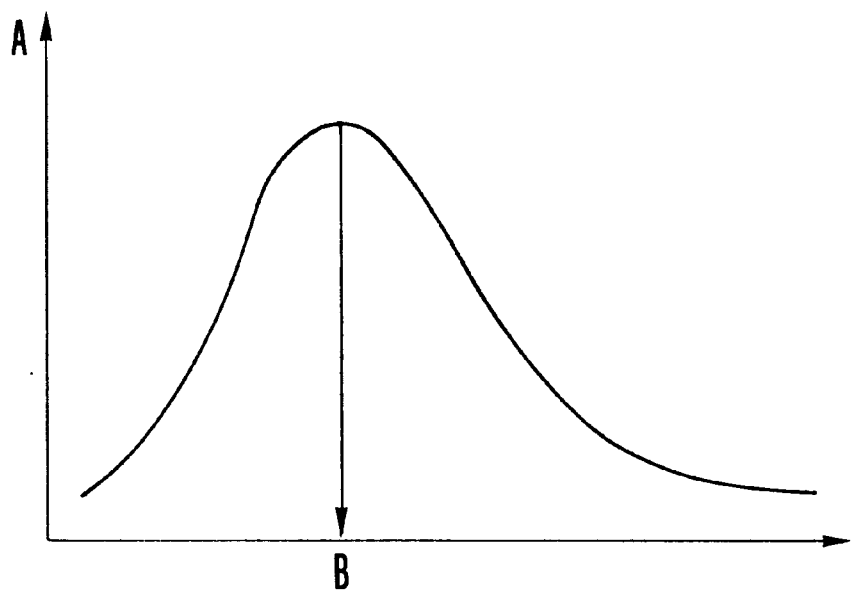

Next, an automatic focus detecting method suited to the lens drive device according to the invention is described on the basis of FIGS. 29(A), 29(B) and 29(C).

A picture of the video camera is entirely shown at 130, having a distance measuring area 131 therein. The focus detecting method of the present embodiment is, in principle, to detect the contrast of the image. By processing the output representing the image having a contrast, for example, shown at 132, the blur amount is determined. Part (a) of FIG. 29(B) shows the video signal of the image 132 from the image sensor 105; and part (b) shows its differentiated wave form. Part (c) shows the wave form obtained by converting the differentiated wave form to the absolute value; and part (d) shows the signal level (evaluation) A obtained by integrating and holding the absolute value of the wave. When the image 132 is sharp, a high signal level is obtained. When not sharp, or blurred, the signal level becomes a low value. Therefore, fundamentally, by detecting the position of the highest signal level A as shown in FIG. 29(C), the position the RR lens group 104 should take when the image is in focus can be discriminated.

The foregoing is the structure of the present embodiment. Then the drive control principle of the lens owing to the present embodiment is described below.

The present invention makes the lens drive control differ by the zoom operating direction. That is, in the zooming of the direction T→W, because all the zoom curves of the lens converge to a certain range on the wide-angle side as shown in FIG. 27(A), as the representative speed $v_n$ selected in response to identification of the zone shown in FIG. 27(B) has the appropriate value, it is relatively easy to let the RR lens fall in this range. Also because the depth of field widens, when zooming in the T→W direction, the drive control of the RR lens group is made by the representative speed $v_n$ specified for each zone.

For zooming of the W→T direction, the zoom curves converging to the certain range must dividedly be assigned to the different values of the object distance. Only by assigning the representative speed $v_n$ to the corresponding zone, therefore, it is difficult to control the movement of the RR lens group so as to trace the zoom curve.

So, in the present embodiment, when to perform zooming in the W→T direction, the RR lens group is made to first move so that the image is blurred to the far focus side and then move so that it is blurred to the near focus side, wherein the speed $v_{nbf}$ chosen so as to effect blurring to the near focus side and the speed υncb chosen so as to effect blurring to the far focus side are made to take such values that the amount of increase or the amount of decrease of the diameter of the produced circle of confusion per unit time becomes constant so that the viewer does not really see the picture as blurred.

It should be noted that the values of the aforesaid speeds υnbf and υncb are determined for each region in each divided zone shown in FIG. 27(B), and are stored divided zone by zone in the speed data memory 231.

Figure 30:
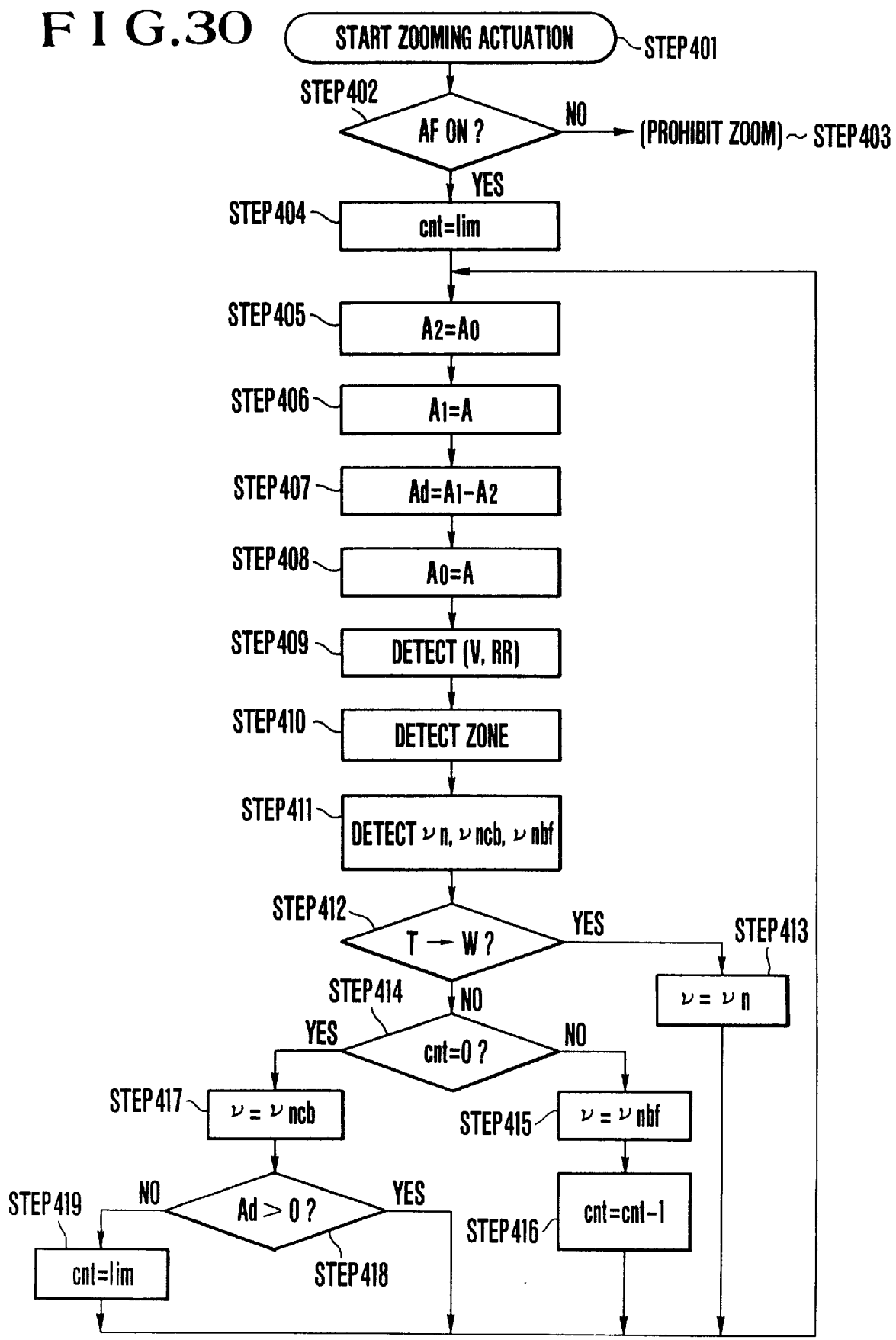
FIG. 30 is a flowchart illustrating the control of the present embodiment.

Next, a process for the operation of the lens drive control by the CPU 230 is described on the basis of the flowchart shown in FIG. 30.

When a zoom button or like is actuated, the main routine begins with a step 401. The main routine repeats a loop beginning with a step 405 in, for example, 1/60 sec.

Also, when the depression of the zoom button or the like is interrupted, or when the variator lens group position reaches up to the terminal end of the range of movement, the main routine stops.

Since the main routine has started at the step 401, whether or not the AF device (automatic focus detecting device) 235 is operative is examined in a step 402. When the AF device is not operative, the zooming operation is prohibited at a step 403. Therefore, in the case of the non-operation of the AF device 235, even if the zoom button or the like has been actuated, zooming does not occur. When the AF is in the operative state, the program advances to a step 404.

In the step 404, a value of the number of times "lim" is put into a counter "cnt" for setting how many times the main routine is to repeat. Incidentally, the values of "cnt" and "lim", though will be referred to later, are constants to be used during the W→T zooming. For example, lim=10 is set.

In the next step 405, the blur evaluation value $A_0$ of the preceding cycle is stored in a register $A_2$. In this case, because, at the time of start of the zooming operation, the preceding cycle does not exit, the value of $A_0=0$ is stored in the register $A_2$.

In a step 406, the blur evaluation value A of the current cycle is stored in a register $A_1$.

In a step 407, $A_1$ (the present blur evaluation value)−$A_2$ (the previous blur evaluation value) is stored in a register Ad.

In a step 408, A (the present evaluation value) is stored in the register $A_0$ in order to use it as the previous blur evaluation value in the next cycle of execution of the routine.

Then, from the positions (V) and (RR) at the present time of the V lens group and the RR lens group, a point (V, RR) in the map of FIG. 27(A) is determined in a step 409.

The zone to which the point (V, RR) detected in the step 409 belongs is determined in a step 410. In the next step 411, the zone representative speed υn for the T→W zooming memorized for every zone, the speed υncb set so that when W→T zooming, the amount of increase of the diameter of the produced circle of confusion per unit time becomes constant and the speed υnbf set likewise to effect blurring to the far focus side are read out.

Whether the zoom button is being pushed in the T→W direction or in the W→T direction is examined in a step 412. If the T→W zooming is actuated, υ=υn is indicated in a step 413, and the RR lens group is moved at this speed.

Meanwhile, when the zooming of the W→T direction is set, whether or not the value of the counter "cnt" is "0" is examined. If it is not "0", the motor is driven at that speed υnbf which assures that the lens moves to the far focus side as has been described before in a step 415.

And, the value of the counter "cnt" is one decremented in a step 416 and return to the step 405 occurs. Assuming that the zoom button continues being pushed in the W→T direction, then this routine is repeated until the value of the counter "cnt" becomes "0". That is to say, as the value "lim" of the counter "cnt" has been set to, for example, "10" in the step 404, it is for a time space of 1/60×10=1/6 sec. that the focusing lens moves at such a speed that a constant circle of confusion per unit time is produced in the direction to the far focus. And, if the initial value of this counter "cnt" is taken large enough within the limit not to exceed the acceptable diameter of a circle of confusion, it is possible to arrange that the RR lens group, when the counter "cnt" has become "0", lies always on the far focus side with the image blurred in an allowable range of the diameters of a circle of confusion.

When the counter "cnt" is determined to be "0" in the step 414, the motor is rotated by now at that speed υncb which leads to the near focus as has been described before in a step 417.

Figure 31:
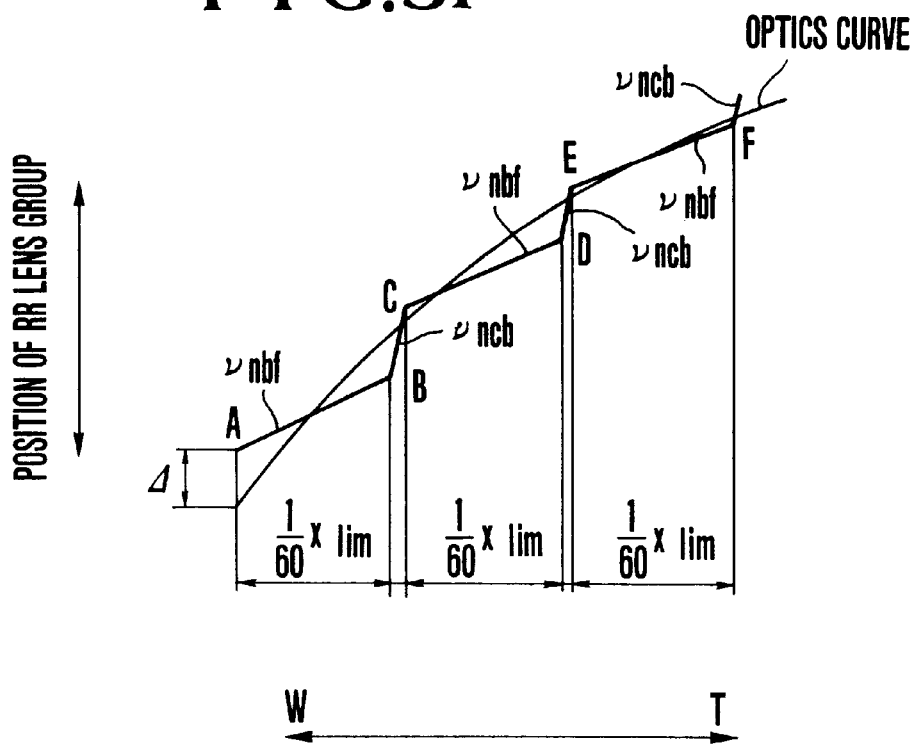
FIG. 31 is a graph of a locus of motion of the RR lens group when controlled by the present embodiment.

In a step 418, whether or not the blur amount Ad is larger than 0 is examined. If the blur amount Ad is positive, as it implies that the focus signal A is improved over the preceding cycle and the focusing is approaching the in-focus state, return to the step 405 occurs without further alteration so that the speed υncb is used again. And, when the blur amount becomes negative, as it implies that the RR lens group overruns the best focus position and puts itself slightly on the near focus side, the value "lim" is inputted into the counter "cnt" in a step 419. The program returns to the step 405 and initiates again a driving of the RR lens group to the far focus side. Here, a routine that follows the step 414 is explained by reference to FIG. 31. Assuming that the RR lens group on the W side lies in a defocused position A by Δ to the near focus side, then when the W→T zoom switch is pushed down, the motor rotates first at the speed υnbf, causing the RR lens group to move until a far focus position B, and then at the speed υncb, causing the movement to a position C. By further moving the focusing lens group in such a way as A→B→C→D→E→F, it is made possible to suppress the blurring during the W→T zooming.

Also, as the RR lens group is moved at such zigzag speeds, if the speeds υnbf and υncb are set to such values that the rate of increase of the diameter of a circle of confusion per unit time becomes constant, the counter value (lim) that defines the time for which the lens is moved at the speed υnbf can be made constant in no relation to the depth of field.

The use of the method described above leads to remove the necessity of detecting which direction the image is blurred, the near focus or the far focus, each time the blurring occurs, because the blurring that occurs at a time when cnt=0 is reached is always to the far focus. As a result, it becomes easy to get the blur fall always within the acceptable depth.

Figure 32:
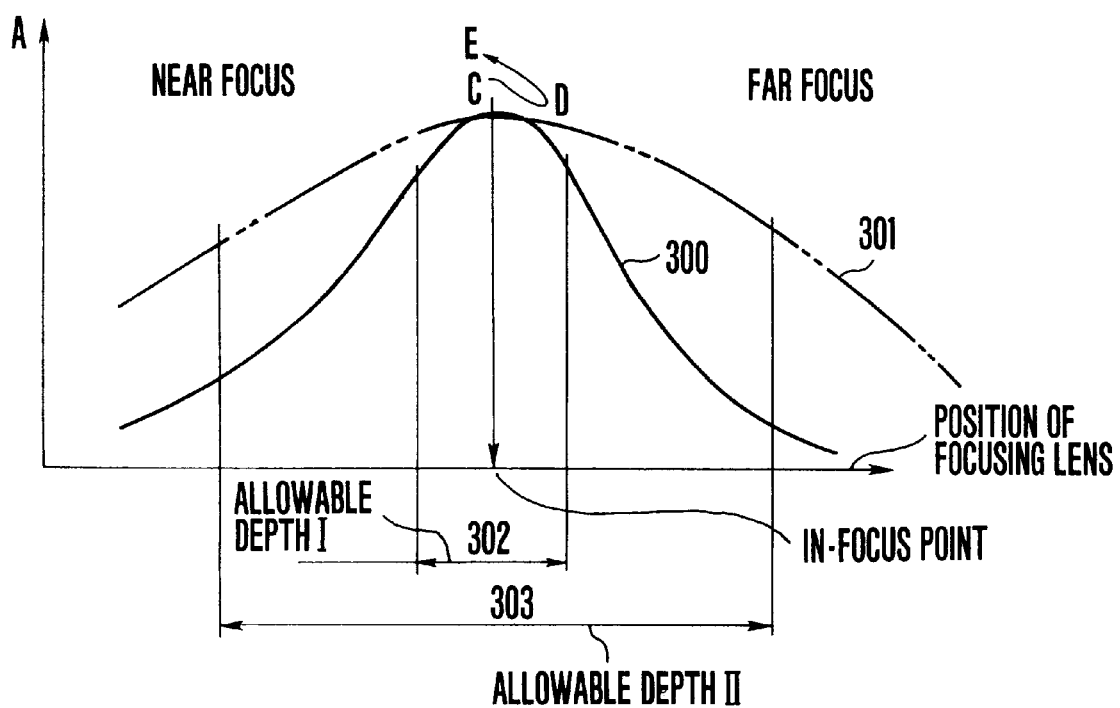
FIG. 32 is a graph illustrating the allowable depth of focus.

FIG. 32 is a graph with the abscissa in the position of the RR lens group and the ordinate in the blur evaluation value A representing the degree of focus obtained from the automatic focus adjusting device. If, under the object condition and each condition of the lens which display such a characteristic as shown by a solid line 300, the allowable depth I shown by a reference numeral 302 is within the acceptable depth, the points C, D and E of FIG. 31 take their places indicated in FIG. 32.

A seventh embodiment of the invention is next described as applied to a case where the allowable depth is widened as the diaphragm further stops down or the focal length is further shortened.

Suppose, in FIG. 32, the characteristic curve 300 is assigned to the case of the longest focal length and full open aperture in combination, then this characteristic curve changes toward, for example, a double dot-and-single dash line 301, when any other photographic situations are encountered. For this case, because of the change of the characteristics of the lens, the allowable range of the depth is changed to a wider allowable depth II.

In the preceding or sixth embodiment, when to determine the speeds vnbf and vncb, for example, the value of the F-number at full aperture is given and under this condition a constant rate of change of a circle of confusion is derived. When the characteristic curves change as shown by the reference numerals 300→301, if the speeds vncb and vnbf and the counter cnt are left the same values, the change of the value A is hardly read as it is buried in the noise. Hence, when the in-focus state is reached becomes unclear.

The seventh embodiment has improved this point by making variable the value of the counter (cnt) from the information of the aperture value F.

Figure 33:
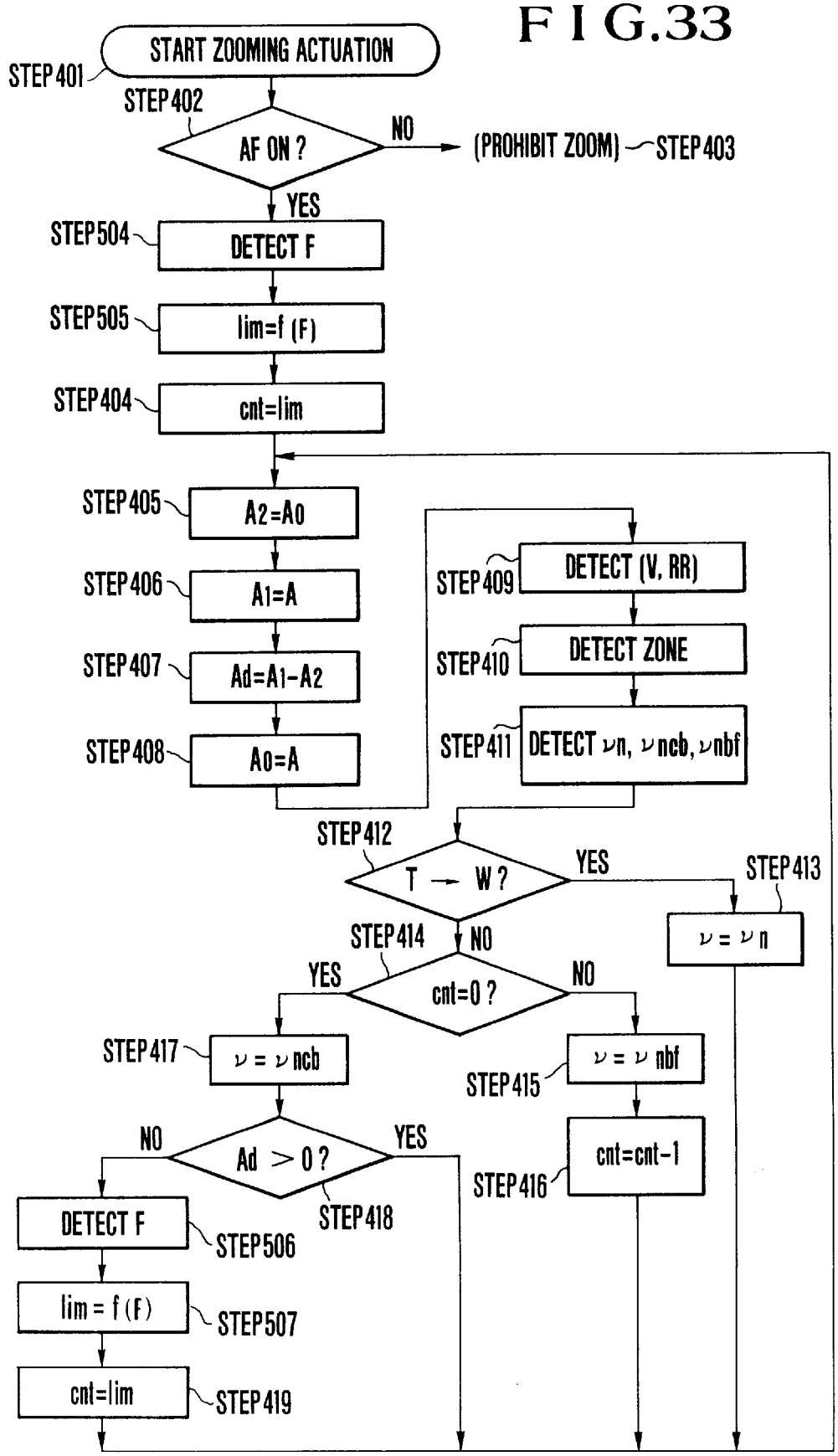
FIG. 33 is a flowchart of a seventh embodiment of the invention.

FIG. 33 is a flowchart to explain the operation of the seventh embodiment, where the same functions as those of the flowchart (FIG. 30) of the sixth embodiment are labeled the same reference step numbers and their explanation is omitted.

In FIG. 33, what is different from the flowchart of FIG. 30 is in the earlier stages than the steps 404 and 419 of putting the value "lim" to the counter "cnt", where the current value of F-number of the photographic lens system is detected (steps 504 and 506) and, depending on this aperture value F, a value "lim" is derived (steps 505 and 507).

It should be noted that though, in this seventh embodiment, it is just before the counter value is set that its optimum value is computed by the formula: lim=f(F), variation may be made. For example, a list of counter values related to a series of aperture values are previously stored in a data memory.

Also, though the F value is used as the only parameter for determining the value "lim", other parameters including the focal length f may be introduced, so that the setting of the counter "cnt" value is adjusted more accurately.

Further, the contents of the speeds vncb and vnbf may be made variable from the information of the aperture value F.

Also, though, in each of the sixth and seventh embodiments, the driving by the speed vnbf is followed by the driving by the speed vncb, this order may be reversed.

As has been described above, according to the sixth and seventh embodiments, particularly when zooming from the wide-angle to the telephoto side, the second lens group is moved first in such a direction that the image is blurred to, for example, the far focus side by a predetermined amount, and then at such a speed that the image is blurred to the near focus side. By using such a zigzag adjustment of the speed of the second lens group, stabilization of the image against blurring can be realized without having to use a complicated mechanism.

Further, the introduction of the aperture size of the diaphragm of the lens system into the control of the speed of movement of the second lens group facilitates a further improvement of the stability of the image against blurring.

It is to be noted that though the embodiments have been described in connection with the rear relay lens as the lens group having both the function of compensating for the image shift during zooming and the focusing function, the invention is not confined thereto and applicable to other types in which the relay lens whole is moved, or the compensator lens, is moved to perform both of the functions with equivalent advantages.

What is claimed is:

1. A video camera device, comprising:
   (A) a lens unit including a variator lens and a focusing lens;
   (B) image sensing means for converting an optical image formed by the lens unit into an electrical signal to output an image signal;
   (C) focus detection means for detecting a focus condition from the image signal output by the image sensing means;
   (D) memory means for memorizing a movement locus information of the focusing lens for maintaining an in-focus condition with correction of variation in position of the in-focus caused by movement of the variator lens;
   (E) first correction means for driving the focusing lens according to the movement locus information read out from the memory means on the basis of the positions of the focusing lens and the variator lens during a zooming operation; and
   (F) second correction means for shifting the position of the focusing lens back or forth relative to the movement locus information selected by said first correction means according to variation in the output of the focus detection means during the zooming operation.

2. A video camera device according to claim 1, wherein said second correcting means operates only when the driving direction of said variator lens is from the wide to the tele.

3. A video camera device according to claim 1, wherein said second correcting means moves the focusing lens back and forth relative to the movement locus at such a speed that a changing speed of a circle of confusion is same.

4. A video camera device according to claim 1, wherein said second correcting means moves the focusing lens in such a manner that defocus is caused always first at a far focus side.

5. A video camera device according to claim 1, wherein said memory means is stored with a plurality of movement loci according to an object distance.

6. A video camera device according to claim 1, wherein said second correcting means operates at a frequency of 1/60 second.

7. A video camera device according to claim 1, further comprising means for prohibiting a zoom operation by said variator lens during non-operation of said focus detection means.

8. A video camera device, comprising:
   (A) a lens unit including a variator lens and a focusing lens independently movable from each other;
   (B) image sensing means for converting an optical image formed by the lens unit into an electrical signal to output an image signal;
   (C) memory means for memorizing a movement locus of the focusing lens for maintaining the in-focus state with correction of variation in position of the in-focus caused by the movement of the variator lens; and
   (D) control means for driving the focusing lens according to the movement locus read out from the memory means on the basis of the positions of the focusing lens and the variator lens, and for varying the control of the focusing lens depending on movement directions of the variator lens.

9. A device according to claim 8, wherein the position of the focusing lens is shifted back and forth relative to the movement locus and is caused to follow the movement locus on the basis of the variation in the output of the in-focus detection means.

10. A video camera device according to claim 9, wherein said second correcting means operates only when the driving direction of said variator lens is from the wide to the tele.

11. A video camera device according to claim 10, wherein said second correcting means moves the focusing lens back and forth relative to the movement locus at such a speed that a changing speed of a circle of confusion is same.

12. A video camera device according to claim 11, wherein said second correcting means moves the focusing lens in such a manner that defocus is caused always first at a far focus side.

13. A video camera device according to claim 9, wherein said focus lens moves back and forth in a depth of field relative to the movement locus during a zooming operation.

14. A lens control device for a lens unit detachably attached to a camera body, comprising:

(A) first lens means for varying an image magnification;

(B) second lens means movable independently of said first lens means for performing a function of compensating of an in-focus position;

(C) position detecting means for detecting positions of said first and second lens means;

(D) memory means provided in said lens unit and memorized with a plurality of position information of the second lens means for maintaining an in-focus condition relative to a position of said first lens means; and (E) a micro computer for driving said second lens means according to the position information read out from said memory means according to the positions detected by said position detecting means and the position information of the in-focus condition.

15. A video camera device according to claim 14, wherein said micro-computer receives the position information of the in-focus condition from a camera micro-computer located on said camera body.

16. A video camera according to claim 15, wherein said control means controls the second lens means at a frequency of 1/60 second.

17. A video camera according to claim 14, wherein said micro-computer means computes a velocity of the second lens means for maintaining the in-focus condition according to the positions detected by said position detecting means and the position information of the in-focus condition.

* * * * *

UNITED STATES PATENT AND TRADEMARK OFFICE
CERTIFICATE OF CORRECTION

PATENT NO. : 5,946,504
DATED : August 31, 1999
INVENTOR(S) : Masahide Hirasawa, et al.

It is certified that error appears in the above-identified patent and that said Letters Patent is hereby corrected as shown below:

Col. 11, line 44, delete "$l_1$" and insert -- $l_1$ --.
Col. 11, line 44, delete "$l_2$" and insert -- $l_2$ --.
Col. 13, line 19, delete "provided to" and insert -- provided for --.
Col. 20, line 33, delete "l" and insert -- $l$ --.
Col. 20, line 41, delete "l" and insert -- $l$ --.

Signed and Sealed this

Seventeenth Day of October, 2000

Attest:

Q. TODD DICKINSON

*Attesting Officer*  *Director of Patents and Trademarks*